(12) United States Patent
Baksh et al.

(10) Patent No.: US 8,435,328 B2
(45) Date of Patent: May 7, 2013

(54) TEN BED PRESSURE SWING ADSORPTION PROCESS OPERATING IN NORMAL AND TURNDOWN MODES

(75) Inventors: Mohamed S. A. Baksh, Wheatfield, NY (US); Marian Simo, Kenmore, NY (US)

(73) Assignee: Praxair Technology, Inc., Danbury, CT (US)

(*) Notice: Subject to any disclaimer, the term of this patent is extended or adjusted under 35 U.S.C. 154(b) by 260 days.

(21) Appl. No.: 13/004,731

(22) Filed: Jan. 11, 2011

(65) Prior Publication Data
US 2012/0174775 A1    Jul. 12, 2012

(51) Int. Cl.
*B01D 53/047*    (2006.01)

(52) U.S. Cl.
USPC ............................................................. 95/96

(58) Field of Classification Search .............. 95/96, 117, 95/127, 130, 139, 140, 143
See application file for complete search history.

(56) References Cited

U.S. PATENT DOCUMENTS

| | | | |
|---|---|---|---|
| 3,430,418 A | 3/1969 | Wagner | |
| 3,564,816 A | 2/1971 | Batta | |
| 3,986,849 A | 10/1976 | Fuderer et al. | |
| 4,077,779 A | 3/1978 | Sircar et al. | |
| 4,234,322 A * | 11/1980 | De Meyer et al. | ........... 95/19 |
| 4,259,091 A | 3/1981 | Benkmann | |
| 4,299,595 A | 11/1981 | Benkmann et al. | |
| 4,299,596 A | 11/1981 | Benkmann | |
| 4,333,744 A | 6/1982 | Fuderer | |
| 4,340,398 A | 7/1982 | Doshi et al. | |
| 4,371,380 A | 2/1983 | Benkmann | |
| 4,381,189 A | 4/1983 | Fuderer | |
| 4,402,712 A * | 9/1983 | Benkmann | ........... 95/98 |
| 4,468,237 A | 8/1984 | Fuderer | |
| 4,475,929 A | 10/1984 | Fuderer | |
| 4,482,361 A | 11/1984 | Whysall | |
| 4,499,208 A | 2/1985 | Fuderer | |
| 4,512,780 A | 4/1985 | Fuderer | |
| 4,553,981 A | 11/1985 | Fuderer | |
| 4,640,694 A | 2/1987 | Leitgeb et al. | |
| 4,650,500 A | 3/1987 | Patel | |
| 4,693,730 A | 9/1987 | Miller et al. | |
| 4,726,816 A | 2/1988 | Fuderer | |
| 4,732,578 A | 3/1988 | Benkmann | |
| 4,761,165 A | 8/1988 | Stöcker et al. | |

(Continued)

FOREIGN PATENT DOCUMENTS

| EP | 0620035 A1 | 10/1994 |
|---|---|---|
| EP | 1219337 A2 | 7/2002 |

(Continued)

OTHER PUBLICATIONS

J. A.C. Silva and A. E. Rodrigues. Analysis of ZLC Technique for Diffusivity Measurements in Bidisperse Porous Adsorbent Pellets. Gas. Sep. Purif., vol. 10, No. 4, pp. 207-224, 1996.

*Primary Examiner* — Frank Lawrence, Jr.
(74) *Attorney, Agent, or Firm* — Iurie A. Schwartz

(57) ABSTRACT

The present invention relates to a ten bed pressure swing adsorption (PSA) system utilizing new and advanced cycles to obtain enhanced hydrogen recovery from a hydrogen containing feed gas (i.e., synthesis gas). More specifically, through the newly developed process cycles, the ten bed PSA system is capable of matching the hydrogen recovery of conventional twelve bed PSA systems designed to manufacture 100 million standard cubic feet per day of gas.

21 Claims, 4 Drawing Sheets

U.S. PATENT DOCUMENTS

| | | |
|---|---|---|
| 4,834,780 A | 5/1989 | Benkmann |
| 4,957,514 A | 9/1990 | Golden et al. |
| 4,964,888 A | 10/1990 | Miller |
| 5,012,037 A | 4/1991 | Doshi et al. |
| 5,051,115 A | 9/1991 | Leitgeb et al. |
| 5,174,796 A | 12/1992 | Davis et al. |
| 5,203,888 A | 4/1993 | Maurer |
| 5,258,056 A | 11/1993 | Shirley et al. |
| 5,294,247 A | 3/1994 | Scharpf et al. |
| 5,518,526 A | 5/1996 | Baksh et al. |
| 5,529,607 A | 6/1996 | Tan |
| 5,565,018 A | 10/1996 | Baksh et al. |
| 5,726,118 A | 3/1998 | Ivey et al. |
| 5,730,003 A | 3/1998 | Nguyen et al. |
| 5,733,359 A | 3/1998 | Doong et al. |
| 5,735,938 A | 4/1998 | Baksh et al. |
| 5,753,010 A | 5/1998 | Sircar et al. |
| 5,858,068 A | 1/1999 | Lansbarkis et al. |
| 5,912,422 A | 6/1999 | Bomard et al. |
| 6,007,606 A | 12/1999 | Baksh et al. |
| 6,027,549 A | 2/2000 | Golden et al. |
| 6,183,539 B1 | 2/2001 | Rode et al. |
| 6,210,466 B1 | 4/2001 | Whysall et al. |
| 6,221,492 B1 | 4/2001 | Moreau et al. |
| 6,261,343 B1 | 7/2001 | Golden et al. |
| 6,293,998 B1 | 9/2001 | Dolan et al. |
| 6,302,943 B1 | 10/2001 | Johnson et al. |
| 6,315,818 B1 | 11/2001 | Monereau |
| 6,340,382 B1 | 1/2002 | Baksh et al. |
| 6,379,430 B1 | 4/2002 | Monereau |
| 6,379,431 B1 | 4/2002 | Xu et al. |
| 6,402,813 B2 | 6/2002 | Monereau et al. |
| 6,425,939 B1 | 7/2002 | Moreau et al. |
| 6,454,838 B1 | 9/2002 | Xu et al. |
| 6,475,265 B1 | 11/2002 | Baksh et al. |
| 6,483,001 B2 | 11/2002 | Golden et al. |
| 6,500,235 B2 | 12/2002 | Zhong et al. |
| 6,503,299 B2 | 1/2003 | Baksh et al. |
| 6,514,317 B2 | 2/2003 | Hirano et al. |
| 6,527,831 B2 | 3/2003 | Baksh et al. |
| 6,530,975 B2 | 3/2003 | Rode et al. |
| 6,565,627 B1 | 5/2003 | Golden et al. |
| 6,565,628 B2 | 5/2003 | Xu et al. |
| 6,632,766 B2 | 10/2003 | Kanazirev |
| 6,699,307 B1 | 3/2004 | Lomax, Jr. |
| 6,733,568 B2 | 5/2004 | De-Souza et al. |
| 6,743,745 B2 | 6/2004 | Jaussaud et al. |
| 6,783,750 B2 | 8/2004 | Shah et al. |
| 6,814,787 B2 | 11/2004 | Golden et al. |
| 6,843,831 B2 | 1/2005 | Van de Kleut et al. |
| 6,849,106 B2 | 2/2005 | Le Bec |
| 6,866,699 B2 | 3/2005 | MacDowall et al. |
| 6,893,483 B2 | 5/2005 | Golden et al. |
| 6,916,358 B2 | 7/2005 | Nakamura et al. |
| 6,918,948 B2 | 7/2005 | Jaussaud et al. |
| 6,923,844 B2 | 8/2005 | Urakami et al. |
| 6,955,711 B2 | 10/2005 | Kawai et al. |
| 7,025,801 B2 | 4/2006 | Monereau |
| 7,025,804 B2 | 4/2006 | Simmons et al. |
| 7,037,485 B1 | 5/2006 | Drnevich et al. |
| 7,041,271 B2 | 5/2006 | Drnevich et al. |
| 7,137,257 B2 | 11/2006 | Drnevich et al. |
| 7,166,151 B2 | 1/2007 | Baksh et al. |
| 7,169,210 B2 | 1/2007 | Baksh et al. |
| 7,179,324 B2 | 2/2007 | Baksh et al. |
| 7,255,727 B2 | 8/2007 | Monereau et al. |
| 7,255,840 B2 | 8/2007 | Papavassiliou et al. |
| 7,276,107 B2 | 10/2007 | Baksh et al. |
| 7,294,172 B2 | 11/2007 | Baksh et al. |
| 7,300,497 B2 | 11/2007 | Urakami et al. |
| 7,300,899 B2 | 11/2007 | Weston et al. |
| 7,306,651 B2 | 12/2007 | Cieutat et al. |
| 7,395,670 B1 | 7/2008 | Drnevich et al. |
| 7,396,387 B2 | 7/2008 | Baksh et al. |
| 7,399,341 B2 | 7/2008 | Patel et al. |
| 7,404,846 B2 | 7/2008 | Golden et al. |
| 7,427,368 B2 | 9/2008 | Drnevich |
| 7,452,407 B2 | 11/2008 | Golden et al. |
| 7,467,519 B2 | 12/2008 | Raybold et al. |
| 7,500,999 B2 | 3/2009 | Aaron et al. |
| 7,517,390 B2 | 4/2009 | Lang |
| 7,537,742 B2 | 5/2009 | Baksh et al. |
| 7,588,742 B2 | 9/2009 | Haik-Beraud et al. |
| 7,594,955 B2 | 9/2009 | Ishihara |
| 7,628,842 B2 | 12/2009 | Schwartz et al. |
| 7,628,843 B2 | 12/2009 | Monereau et al. |
| 7,632,476 B2 | 12/2009 | Shah et al. |
| 7,648,562 B2 | 1/2010 | Monereau et al. |
| 2001/0009125 A1* | 7/2001 | Monereau et al. ............. 95/117 |
| 2003/0015091 A1* | 1/2003 | Xu et al. .......................... 95/96 |
| 2005/0098034 A1* | 5/2005 | Gittleman et al. ............... 95/96 |
| 2009/0223371 A1 | 9/2009 | Nakao et al. |
| 2010/0242722 A1 | 9/2010 | Belanger et al. |

FOREIGN PATENT DOCUMENTS

| | | |
|---|---|---|
| EP | 1486245 A1 | 12/2004 |
| EP | 1972367 A1 | 9/2008 |
| WO | WO02096539 A1 | 12/2002 |

* cited by examiner

Advanced bed configuration/layering

TEN BED PRESSURE SWING ADSORPTION PROCESS OPERATING IN NORMAL AND TURNDOWN MODES

FIELD OF THE INVENTION

The present invention relates to a ten bed pressure swing adsorption (PSA) system utilizing new and advanced cycles to obtain enhanced hydrogen recovery from a hydrogen containing feed gas (i.e., synthesis gas). More specifically, through the newly developed process cycles, the ten bed PSA system is capable of matching the hydrogen recovery of conventional twelve bed PSA systems designed to manufacture 100 million standard cubic feet per day of gas. The ten bed PSA system and associated process cycles is advantageous as it provides approximately 20% reduction in the bed size factor. Additional capital cost savings are realized as a result of utilizing two fewer beds, and associated valves and piping. The present ten bed PSA system can be operated in a turndown mode where one or more beds are taken offline, also referred herein as turndown mode. In addition, the invention relates to a novel adsorbent layering employed in the beds of the PSA.

BACKGROUND OF THE INVENTION

The need for high purity gasses, such as hydrogen, processed from effluents in the chemical process industries remain. These effluents are hydrogen containing feed mixtures gases (i.e., synthesis gases), from the likes of steam methane reforming of natural gas or naptha, catalytic reforming of hydrocarbons, isomerization processes, etc., which are routed to a PSA for further processing. This growing demand requires the need to develop highly efficient separation processes (e.g., PSA) for hydrogen ($H_2$) production from various feed mixtures. In order to obtain highly efficient PSA separation processes, both the capital and operating costs of the PSA system must be reduced. Some ways of reducing PSA system cost include a decrease in the adsorbent inventory, reduction in the number of PSA beds, and using advanced cycles in the PSA processes. The aforementioned ways of reducing the PSA system cost constitute the elements of the present invention.

Conventional PSA systems are well known for separating feed mixture gases which contain components with different adsorption characteristics. For example, in a typical PSA system, a multicomponent gas is passed to at least one of multiple adsorption beds at an elevated pressure to adsorb at least one strongly sorbed component while at least one component passes through. In the case of hydrogen PSA, hydrogen is the most weakly adsorbed component which passes through the bed. At a defined time, the feed step is discontinued and the adsorption bed is co-currently depressurized in one or more steps, counter-currently purged in one or more steps and counter-currently depressurized in one or more steps to permit essentially pure hydrogen product to exit the bed with a high recovery. The sequence of steps is not limited to the aforementioned, and a combination of two or more steps can be performed as part of a single step.

In the related art, U.S. Pat. No. 4,475,929 discloses four, six, nine and ten bed PSA systems with cycles that utilize higher pressure adsorption, co-current depressurization to intermediate pressure, countercurrent depressurization and/or lower pressure purge and repressurization. A co-current purge step is employed at adsorption pressure prior to co-current depressurization. Methane or natural gas is employed as the co-current purge gas.

U.S. Pat. No. 3,986,849 describes an adiabatic PSA separation of feed gas mixtures such as hydrogen containing carbon dioxide, and nitrogen impurities using at least seven beds in the PSA system. At least two beds are on the feed step at any instant. In accordance with this patent disclosure, seven, eight, nine and ten bed PSA systems are used in hydrogen purification systems.

U.S. Pat. No. 4,650,500 is directed to a 10-3-3 PSA cycle (10 bed PSA system-3 beds in production at any instant-3 bed-to-bed equalization steps) to achieve improved PSA process performance. The number of beds on the adsorption step of a pressure swing adsorption cycle is varied cyclically throughout the cycle. As a result, the final bed repressurization step is separated from the partial repressurization-pressure equalization step, to allegedly enhance the product recovery is enhanced without discontinuity in the flow of product effluent from the adsorption system or the use of an external repressurization storage tank. This patent also discloses the use of the 10-3-3 PSA cycle for hydrogen purification.

U.S. Pat. No. 6,379,431 discloses a ten bed hydrogen PSA process, which allegedly has same recovery as the conventional twelve-bed PSA system. The process has four pressure equalization steps followed by provide purge, blow down, purge, pressure equalization and product repressurization steps. However, the cycles do not contain four full equalization steps, and some cycles include idle steps. Moreover, the process cycles described in U.S. Pat. No. 6,379,431 do not follow a sequential refluxing protocol, resulting in degradation of hydrogen recovery.

In addition to the cycles, the related art also discusses conventional adsorbent materials utilized in the beds as a means for improving product recovery in hydrogen PSA systems. For example, U.S. Pat. No. 6,814,787 is directed to a PSA apparatus and process for the production of purified hydrogen from a feed gas stream containing heavy hydrocarbons (i.e., hydrocarbons having at least six carbons). The apparatus includes at least one bed containing at least three layers. The layered adsorption zone contains a feed end with a low surface area adsorbent (20 to 400 $m^2/g$) which comprises 2 to 20% of the total bed length followed by a layer of an intermediate surface area adsorbent (425 to 800 $m^2/g$) which comprises 25 to 40% of the total bed length and a final layer of high surface area adsorbent (825 to 2000 $m^2/g$) which comprises 40 to 78% of the total bed length.

U.S. Pat. No. 6,027,549, discloses a PSA process for the removal of carbon dioxide and then using activated carbons having bulk densities in the range of 560-610 $kg/m^3$ (35-38 $lb/ft^3$) and particle sizes in the range of 1-3 mm diameter. However, only a minimal advantage in recovery (about 0.2%) is achieved when the bulk density in the range of 35 to 38 $lb/ft^3$ is used in a five bed PSA process to produce hydrogen.

U.S. Pat. No. 6,340,382 is directed to a PSA process that purifies hydrogen from a mixture that passes through an aluminum oxide ($Al_2O_3$) layer for moisture removal, then through activated carbon layer for carbon dioxide ($CO_2$), carbon monoxide (CO), and methane ($CH_4$) removal, and finally through CaX zeolite layer for nitrogen ($N_2$) removal to produce high purity $H_2$ (>99.99%). CaX is at least 90% Ca exchanged with $SiO_2/Al_2O_3$=2.0.

U.S. Pat. No. 7,537,742 B2, co-owned by the assignee of the present invention, relates to an optimum set of adsorbents for use in hydrogen PSA systems. Each adsorbent bed is divided into four regions. The first region contains adsorbent for removing water. The second region contains a mixture of strong and weak adsorbents to remove bulk impurities like $CO_2$. The third region contains a high bulk density (>38 lbm/ft³) adsorbent to remove remaining $CO_2$ and most of $CH_4$ and CO present in the hydrogen containing feed mixtures. The fourth region contains adsorbent having high Henry's law constants for the final cleanup of $N_2$ and residual impurities to produce hydrogen at the desired high purity.

U.S. Pat. No. 6,402,813 B2 describes the purification of a gas mixture by adsorption of the impurities on carbon adsorbent formed by a combination of several different activated carbons. In particular, a PSA process is described for purifying a gas, such as hydrogen, nitrogen, oxygen, carbon monoxide, argon, methane or gas mixtures containing these components. The gas stream to be purified is passed through layers of carbons, wherein the ordering of the carbon layers are such that at least one of the following conditions exist: (1) the density (D) is such that D1<D2, (2) the specific surface area (SSA) is such that SSA1>SSA2, 3) the mean pore size (MPS) is such that MPS1>MPS2, and (4) the pore volume is such that PV1>PV2. More specifically, this patent relates to a process in which at least two layers of activated carbons are used in which the first layer carbon has a lesser density than the second, the first carbon has more specific surface area, and also more mean pore size than the second carbon.

To overcome the disadvantages of the related art PSA systems, it is an object of the present invention to introduce new and advanced PSA cycles for ten bed PSA in normal operation, as well as turndown modes. These cycles for the ten bed PSA system include at least two additional bed-to-bed equalization steps resulting in higher hydrogen recovery. The remained of the cycles, in the turndown mode, provide improved process performance due to higher number of beds on simultaneous feed and/or bed-to-bed equalization steps. It is a further object of the invention to design the cycles to include the use of a sequential refluxing protocol so as to improve the regenerations steps, thereby resulting in superior performance. The invention provides the following features: (1) no need for additional storage tank; (2) no idle steps; (3) continuous PSA tail gas (offgas) flow and (4) higher recovery than the related art cycles.

It is another object of the invention to modify the adsorbent system in each bed to contain at least three layers of adsorbents (e.g., alumina, activated carbon and zeolite), wherein the active carbon and zeolite components are layered based on particle size and enables additional improvement in hydrogen recovery. Therefore, an efficient PSA separation process has been found with high hydrogen recovery, lower adsorbent requirements, (i.e., lower bed size factor (BSF)), and lower capital and operating costs. Additionally, the process should operate efficiently when one or more beds are taken offline for operational reasons such as valve failure or due to reduced demand (referred herein, as "turndown" or "turndown mode").

BACKGROUND OF THE INVENTION

The invention provides a pressure swing adsorption process for the separation of a pressurized feed gas supply containing one or more strongly adsorbable components and at least one less strongly adsorbable product gas in a multiple bed system. The feed gas is supplied to a feed end of an adsorbent bed containing solid adsorbent material(s), which preferentially adsorb the more strongly adsorbable component(s) and withdrawing the least strongly adsorbable product component from an exit end of the adsorbent bed. This is performed in PSA cycle(s) inclusive of steps in which the continuous feed gas sequentially, and co-currently flows through each of the adsorber beds to produce gas product using continuous feed gas, pressurization step(s), pressure equalization step(s), blowdown step(s), and purge step(s).

The product gas of the process is preferably hydrogen although the process can be extended to other separation processes such as helium purification, natural gas upgrading, $CO_2$ production from synthesis gas or other source containing $CO_2$ in the supply feed or in other PSA processes for coproduction of $H_2$ and $CO_2$. One of the novel features of the present invention is the introduction of a new and advanced cycle to a ten bed PSA system having five equalization steps to achieve enhanced $H_2$ recovery. This cycle can be further modified and operate the PSA system in a turndown mode with a relatively small reduction in throughput, thereby allowing the PSA system to operate with as few as five beds. In addition, the new PSA process cycles take advantage of the sequential refluxing protocol to improve the regeneration steps, and the overall performance of the PSA system.

Another novel feature of the invention is in the layered adsorbents, which can be utilized in the beds. These layered configurations of carbon and/or zeolite components differ from another layer of similar adsorbent material in particle size. These layered configurations of the bed materials and the PSA cycles provide a synergistic effect with an overall improvement in hydrogen recovery and throughput of 1-2% over conventional PSA cycles.

In a first exemplary embodiment of the invention, pressure swing adsorption process for separating a pressurized supply feed gas is provided. The feed gas containing one or more strongly adsorbable component is separated from at least one less strongly adsorbable product gas component in a ten bed adsorbent system to produce a continuous stream of product gas enriched in the less strongly adsorbable component and a continuous stream of offgas that is enriched in strongly adsorbable components, wherein the process cycle has twenty steps including five bed-to-bed equalizations steps, while three of the beds are in production at any time.

In other exemplary embodiments of the invention, the pressure swing adsorption system is in turndown mode with only nine, eight seven, six or five beds online. In these embodiments, the process cycles are described herein.

BRIEF DESCRIPTION OF THE FIGURES

The objects and advantages of the invention will be better understood from the following detailed description of the preferred embodiments thereof in connection with the accompanying figures wherein.

DETAILED DESCRIPTION OF THE INVENTION

Figure 1:
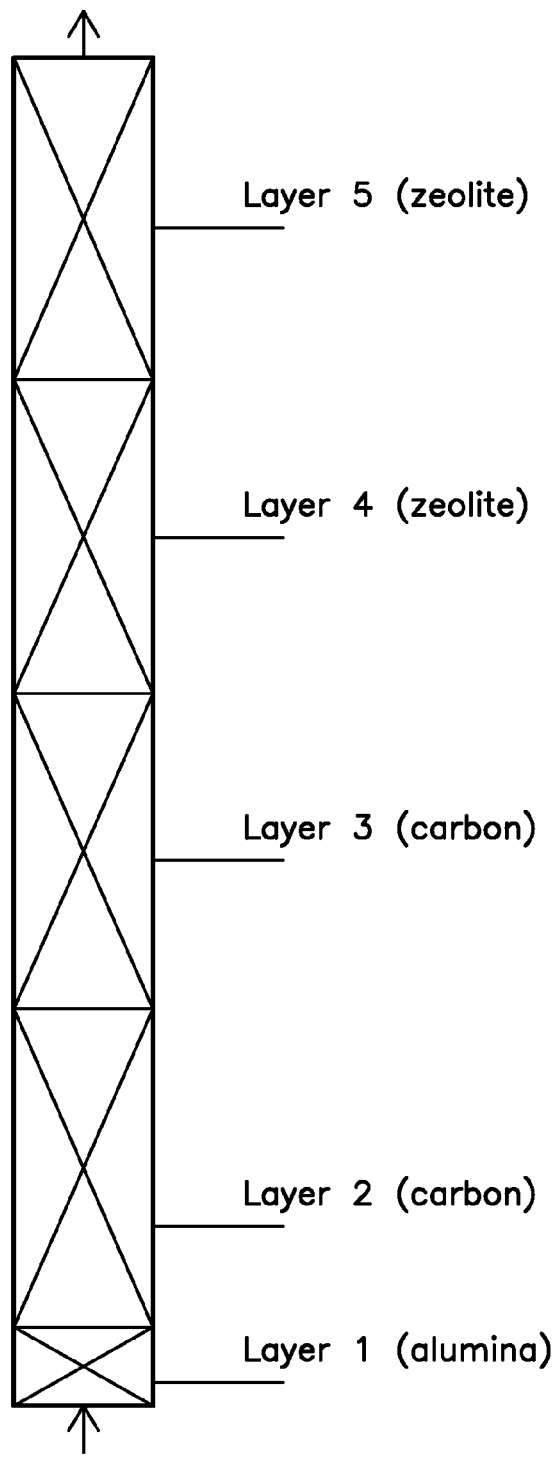
FIG. 1 illustrates an advanced bed configuration/layering in accordance with one aspect of the invention.

The invention discloses a complete set of high efficiency PSA processes/cycles employed in a ten bed PSA system both in normal and turndown modes. When operating in normal mode (i.e., ten beds are online), this large scale PSA system attains about 100 million standard cubic feet per day (MMSCFSD) of hydrogen production. Although the PSA processes/cycles described herein are with respect to the production of hydrogen, it will be understood by those skilled in the art that these cycles are applicable to any separation process of hydrogen from various feed mixtures regardless of the source.

With reference to Table 1, below, the new and advance cycles for the ten bed PSA system are contrasted with conventional cycles for twelve ten bed PSA system in normal operating conditions and turndown mode. The latter naturally includes a ten bed PSA system in turndown mode. The nomenclature utilized herein to refer to the cycles, and by way of example in a 10-3-5 cycle, the first number refers to the number of beds in the PSA system, the second number refers to the number of beds in parallel feed (i.e., at any instant processing feed) and the last number refers to the number of bed-to-bed equalization steps in a particular cycle.

TABLE 1

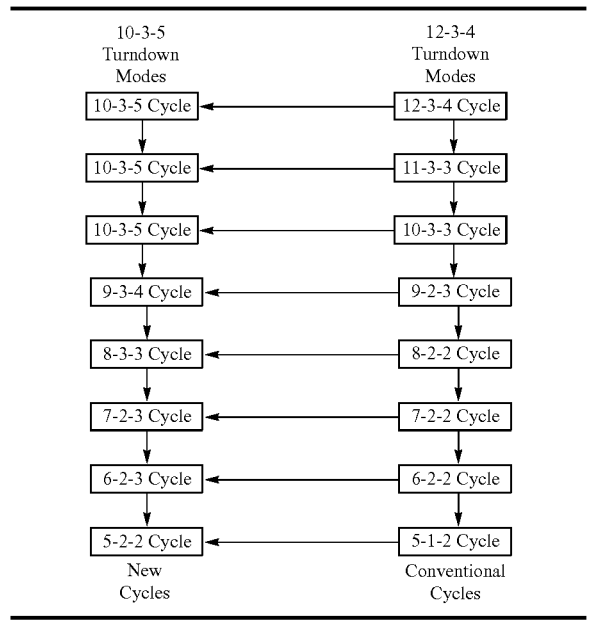

The conventional 10-3-3 cycle (i.e., the PSA system in 12-3-4 turndown mode) defines a PSA cycle sequence using ten beds with three beds at any instant processing feed and with three bed-to-bed equalization steps. The new cycle proposed in this invention employs 10-3-5 cycle featuring two additional equalization steps resulting in higher hydrogen recovery. The remaining cycles presented in Table 1 correspond to so-called turndown or exceptional modes of operation where it is necessary to operate the process with fewer beds. All of the turndown cycles are offering improved process performance due to higher number of parallel feeds and/or bed-to-bed equalization steps. The various cycles and their mode of operation are described in detail below.

Another aspect of the invention concerns the adsorbents loaded into the beds of the hydrogen PSA to enhance the recovery of hydrogen. It has been found that the three layers of adsorbents where each layer is subdivided into two layers containing the same adsorbent, yet with different particle size, optimal adsorption and desorption kinetics for specific impurities present in the hydrogen containing feed gas is attained. This advanced adsorbent layering configuration thereby results in an improvement in hydrogen recovery.

Typical hydrogen PSA process utilizes three different adsorbents loaded in the vessel from the bottom to the top in the order such as (1) alumina; (2) activated carbon and (3) zeolite. There are five major impurities to be removed by adsorption process. Alumina adsorbs the moisture contained in the feed gas. Activated carbon layer is usually designed to take care of carbon dioxide and hydrocarbons such as methane, ethane and propane. The zeolite function is to remove carbon monoxide, nitrogen, argon and residual methane not taken out by activated carbon placed upstream of the zeolite. Additional details of the layers of adsorbents in each PSA bed are discussed in Baksh et al (U.S. Pat. No. 7,537,742 B2), which is co-owned by the assignee of the present invention, and incorporated by reference herein in its entirety.

FIG. 1 is illustrative of the adsorbents layers in each of the PSA beds of the invention. The adsorption properties in layers two, three, four and five are fine tuned by optimizing the particle size of the adsorbent used to achieve optimal PSA process performance. By way of example, layers two and three are identical (i.e., both are the same carbon material) except for the difference in particle sizes. Likewise, layers four and five are identical (i.e., both are the same zeolite material), but their particle size is different. The adsorber vessel design and configuration is such that it will be capable to adsorb five different components. Ideally, layer 1 adsorbs moisture, layer 2 adsorbs carbon dioxide, layer 3 adsorbs methane, layer 4 adsorbs carbon monoxide and layer 5 adsorbs nitrogen. Those skilled in the art will recognize that the process recovery will be maximized when adsorbents are fully utilized. Using a three layer design, the skilled artisan has only three degrees of freedom to size the adsorber for removal of five components. The inventive approach adds two more degrees of freedom thus making it possible to achieve higher hydrogen recovery in combination with the cycles of the present invention.

The adjustment of the adsorbent particle size affects the rate of adsorption and desorption process—the adsorption capacity is independent of particle size. The diffusion resistance in an adsorption process is the sum of all diffusion resistances within the particle of the adsorbent material. The change in the particle size may or may not affect the overall diffusion resistance depending on the level of contribution of the diffusion phenomena affected by the particle size.

Figure 2A:
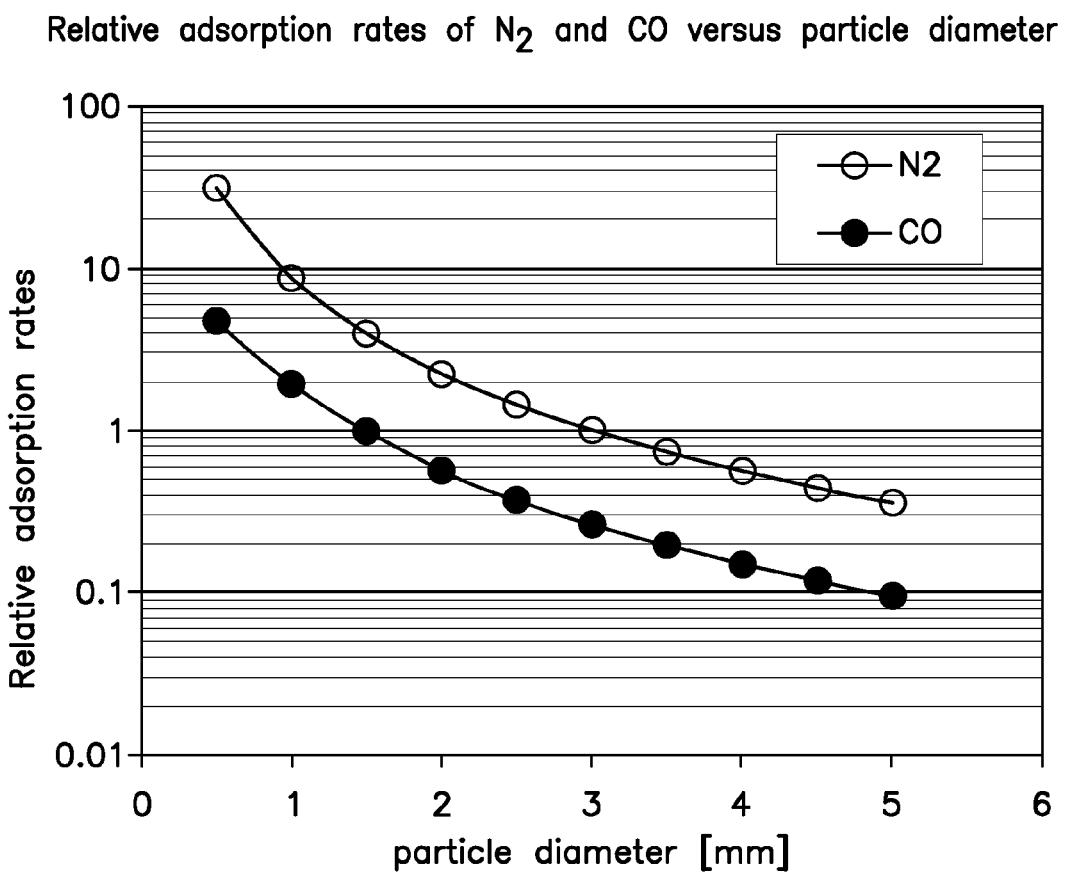
FIG. 2A is a plot of the relative adsorption rates of $N_2$ and CO versus particle diameter for the zeolite layers shown in FIG. 1.

In one embodiment, CaX(2.3) zeolite is used in the fourth and fifth layers of FIG. 1. The layers are sized such that layer four preferably adsorbs carbon monoxide and layer five preferably adsorbs nitrogen. With reference to FIG. 2A, the dependence of relative adsorption rates on particle diameter for both nitrogen and carbon monoxide is shown. The Zero Length Column (ZLC) technique is employed to obtain the data plotted in FIG. 2A. See, J. A. C. Silva & A. E. Rodrigues, Gas. Sep. Purif., Vol. 10, No. 4, pp. 207-224, 1996.

The value of the relative adsorption rate is the ratio of true adsorption rate and the standard rate value. The standard rate value corresponds to a required minimum rate needed to yield the enhanced PSA process performance. If the same particle size (e.g., 2.5 mm) is used for both layers in the process the requirement for nitrogen rate is satisfied. However, as can be determined from FIG. 2A, the CO rate relative to standard adsorption rate is only 40% of the required minimum. Therefore, it is desirable to decrease the zeolite particle size in layer four in order to increase the rate of carbon monoxide adsorption. A value of 1.5 mm meets the design specification for the rate of carbon monoxide in this particular exemplary embodiment. It is obvious that one could increase the nitrogen rate as well by decreasing the particle size in layer five. As a result, only negligible process improvement will be realized since the nitrogen adsorption rate was already above required minimum value. On the other hand; the process performance can suffer from the increased pressure drop in the bed. The preferred layering for this particular example will be particle sizes larger than 2 mm and smaller than 3 mm for layer five and particle sizes larger than 0.5 mm and smaller than 2 mm for layer four.

Figure 2B:
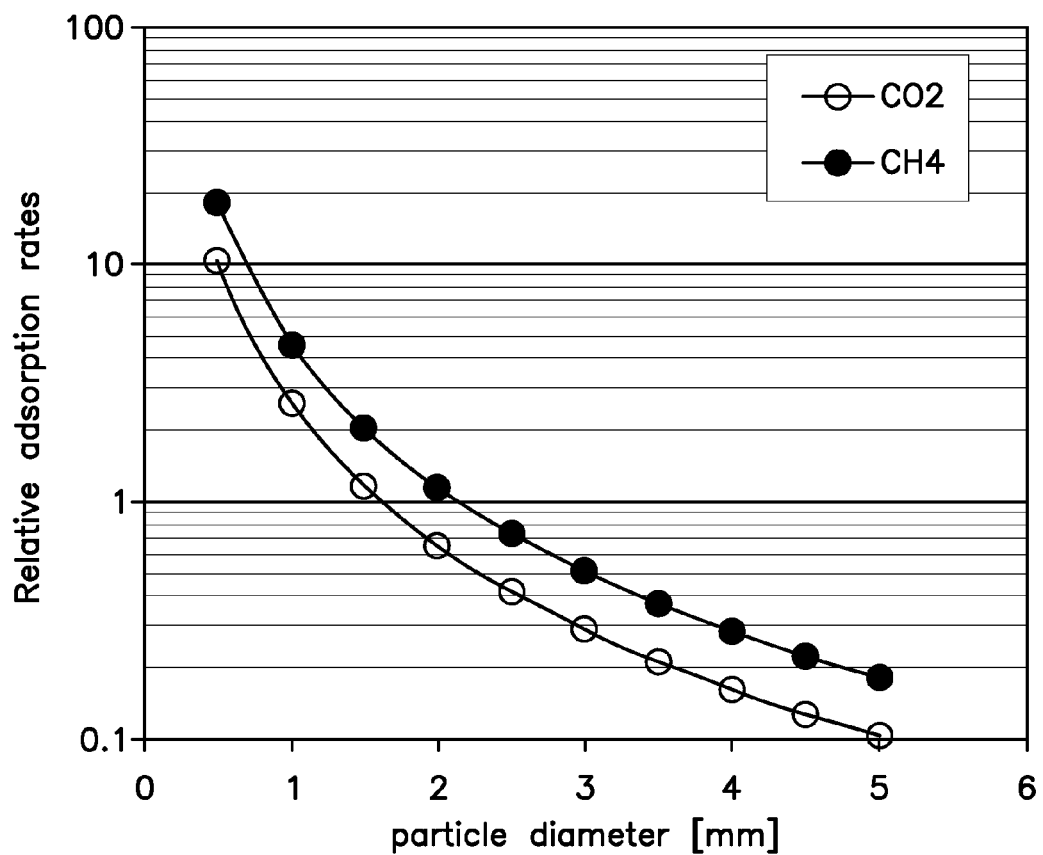
FIG. 2B is a plot of the relative adsorption rates of $CO_2$ and $CH_4$ versus particle diameter for the carbon layers shown in FIG. 1.

Carbon layers two and three will be occupied with the carbon particles of different size as well. The ZLC technique is employed once again to measure the adsorption rates for carbon dioxide and methane on the carbon material. The rate data normalized by the standard rate is summarized in FIG. 2B. The rate for methane is satisfactory at particle sizes less than 2.25 mm. However, the smaller particles are needed to obtain reasonable rates for carbon dioxide. By inspection of the data in FIG. 2B, the preferred carbon particle size for carbon dioxide take out is less than 1.5 mm and for methane less than 2.0 mm. Thus the layering for this particular example will be particle sizes larger than 1.0 mm and smaller than 2.0 mm for layer three and particle sizes larger than 0.5 mm and smaller than 1.5 mm for layer two.

The novel PSA cycles of the present invention will now be described with reference to various exemplary embodiments. In one embodiment of the invention, the novel PSA system employs a twenty-step, ten adsorber bed PSA cycle having five equalization steps, in addition to purging, blowdown, and product pressurization steps (referred herein as "the 10-3-5 PSA cycle"). The PSA system includes a continuous supply of feed gas to at least three beds which are simultaneously in the adsorption phase. These three beds separate the pressurized supply feed gas containing one or more strongly adsorbable component and allow the less strongly adsorbable hydrogen product gas to exit the beds. As shown in Table 1, above, the 10-3-5 PSA cycle can be operated with ten beds on line, while a conventional 12-3-4 PSA system would be in turn-down mode, operating with either eleven or ten beds. As a result, the additional equalization steps in the cycles of the present invention, result in a higher hydrogen recovery and hydrogen production matching the throughput of a twelve bed system.

In another embodiment of the invention, the PSA system can be utilized in turndown mode with nine beds. The PSA cycle for the nine beds would include eighteen steps, where three beds are in adsorption and has four bed-to-bed equalization steps in addition to the purging and product pressurization steps (referred herein as "the 9-3-4 PSA cycle").

In a further embodiment of the invention, the PSA system has eight beds and employs sixteen steps in the cycle where three of the beds are simultaneously in the adsorption phase, and each bed has at least three equalization steps with another bed in addition to purging and product pressurization steps (referred herein as "the 8-3-3 PSA cycle").

In yet another embodiment, the PSA system has seven beds and employs twenty-one steps in the cycle where two of the beds are simultaneously in the adsorption phase, and each bed has at least three equalization steps (i.e., with another bed in the system) in addition to purging and product pressurization steps (referred herein as "the 7-2-3 PSA cycle").

In another embodiment, the PSA system has six beds and employs eighteen steps in the cycle where two of the beds are simultaneously in the adsorption phase, and each bed has at least three bed-to-bed equalization steps in addition to purging and product pressurization steps (referred herein as "the 6-2-3 PSA cycle").

In a further embodiment, the PSA system has five beds and employs fifteen steps in the cycle where two of the beds are simultaneously in the adsorption phase, and each bed has at least two bed-to-bed equalization steps in addition to purging and product pressurization steps (referred herein as "the 5-2-2 PSA cycle").

Figure 3:
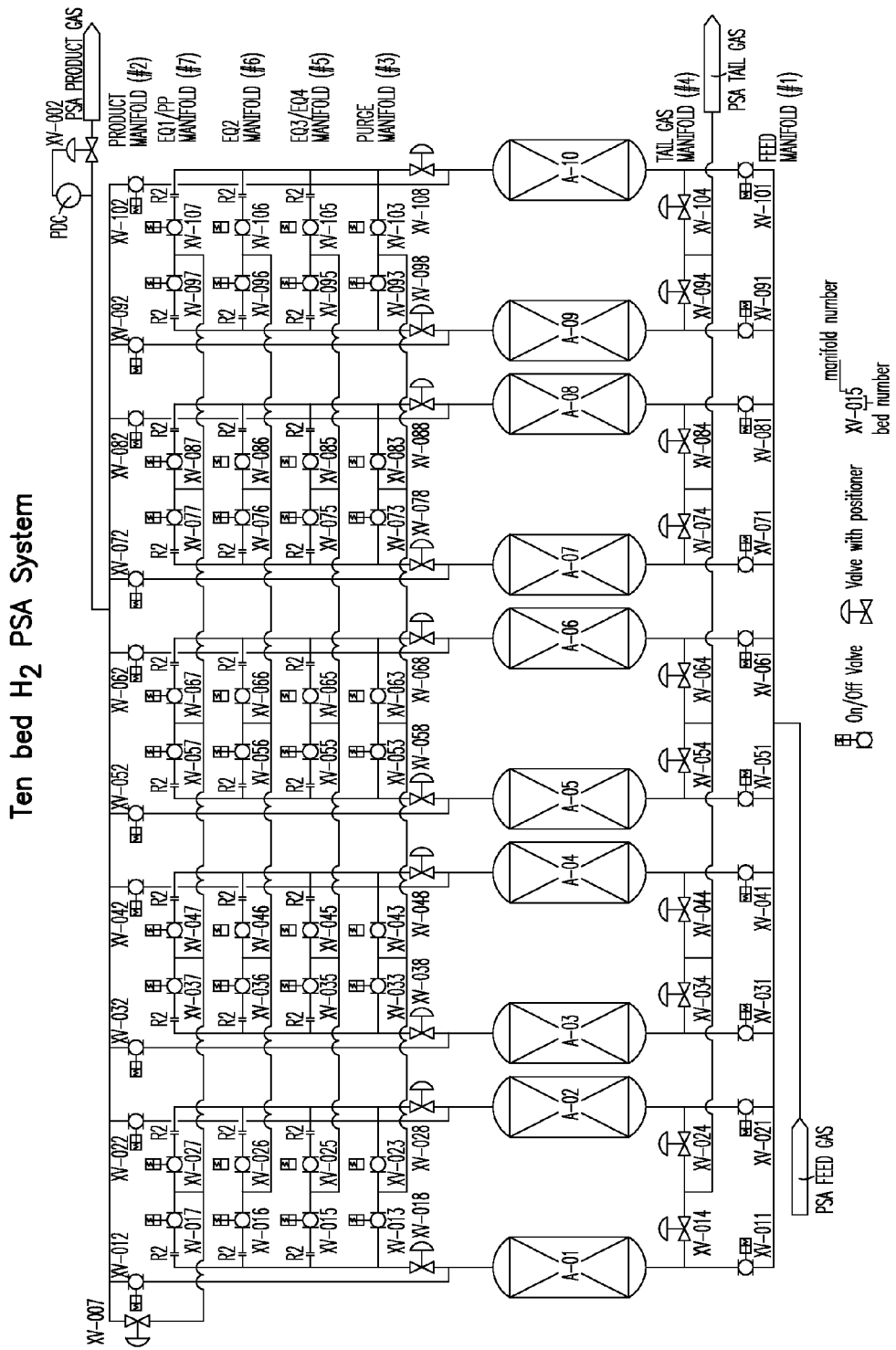
FIG. 3 is an illustrative ten bed $H_2$ PSA system/skid utilized with the cycles of the present invention.

With reference to FIG. 3 and Tables 2 and 3, the mode of operation for the 10-3-5 PSA cycle is illustrated. Specifically, the sequence of steps for the 10-3-5 PSA cycle is performed in the order recited in each of the adsorption vessels in turn.

TABLE 2

10-3-5 PSA cycle chart

| Bed # | Step: | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| 1 | A1 | A2 | A3 | A4 | A5 | A6 | E1 | E2 | E3 | E4 | E5 | PPG | BD | PG | E5' | E4' | E3' | E2' | E1' | PP |
| 2 | E1' | PP | A1 | A2 | A3 | A4 | A5 | A6 | E1 | E2 | E3 | E4 | E5 | PPG | BD | PG | E5' | E4' | E3' | E2' |
| 3 | E3' | E2' | E1' | PP | A1 | A2 | A3 | A4 | A5 | A6 | E1 | E2 | E3 | E4 | E5 | PPG | BD | PG | E5' | E4' |
| 4 | E5' | E4' | E3' | E2' | E1' | PP | A1 | A2 | A3 | A4 | A5 | A6 | E1 | E2 | E3 | E4 | E5 | PPG | BD | PG |
| 5 | BD | PG | E5' | E4' | E3' | E2' | E1' | PP | A1 | A2 | A3 | A4 | A5 | A6 | E1 | E2 | E3 | E4 | E5 | PPG |
| 6 | E5 | PPG | BD | PG | E5' | E4' | E3' | E2' | E1' | PP | A1 | A2 | A3 | A4 | A5 | A6 | E1 | E2 | E3 | E4 |
| 7 | E3 | E4 | E5 | PPG | BD | PG | E5' | E4' | E3' | E2' | E1' | PP | A1 | A2 | A3 | A4 | A5 | A6 | E1 | E2 |
| 8 | E1 | E2 | E3 | E4 | E5 | PPG | BD | PG | E5' | E4' | E3' | E2' | E1' | PP | A1 | A2 | A3 | A4 | A5 | A6 |
| 9 | A5 | A6 | E1 | E2 | E3 | E4 | E5 | PPG | BD | PG | E5' | E4' | E3' | E2' | E1' | PP | A1 | A2 | A3 | A4 |
| 10 | A3 | A4 | A5 | A6 | E1 | E2 | E3 | E4 | E5 | PPG | BD | PG | E5' | E4' | E3' | E2' | E1' | PP | A1 | A2 |

It will be understood that the nomenclature provided for this 10-3-5 PSA cycle is the same for all the cycles discussed herein, where:

A1=First Adsorption Step
A2=Second Adsorption Step
A3=Third Adsorption Step
A4=Fourth Adsorption Step
A5=Fifth Adsorption Step
A6=Sixth Adsorption Step
E1=First Equalization Down
E2=Second Equalization Down
E3=Third Equalization Down
E4=Fourth Equalization Down
E5=Fifth Equalization Down
PPG=Provide Purge Gas
BD=Blowdown
PG=Purge
E5'=Equalization Up (using gas from E5 step)
E4'=Equalization Up (using gas from E4 step)
E3'=Equalization Up (using gas from E3 step)
E2'=Equalization Up (using gas from E2 step)
E1'=Equalization Up (using gas from E1 step)
PP=Product Pressurization In some of the cycles, and as the particular cycle may require, the following additional nomenclature shall be employed:

A6-A8=Sixth to eighth Adsorption Step
A6/PP=Sixth Adsorption Step/Product Pressurization
PPG1=First Provide Purge Gas Step
PG1=Purge using gas from PPG Step
PPG2=Second Provide Purge Gas Step
BD1=First Blowdown Step BD2=Second Blowdown Step
PG2=Purge Step using gas from PPG2 Step
PG1=Purge Step using gas from PPG1 Step In Table 2, the rows correspond to a particular bed in the PSA system, while the columns represent the step number. The duration of one cycle sequence (one row) is referred to as the total cycle time or cycle time (CT). The cycle time is constant for each bed. The relative shift in the cycle steps among the beds can be inferred from Table 2, as well. This shift is equal to $1/10^{th}$ of the CT since there are ten beds in this particular cycle. In order for the 10-3-5 PSA cycle to be fully defined the step times for steps 1 and 2 must be assigned—such as $t_1$, and $t_2$. The duration of basic block is then defined as $t_1+t_2$. Employing the cycle periodicity described above, the $CT=10*(t_1+t_2)$ and it follows that the duration of the odd numbered steps is equal in time to $t_1$ and the even numbered steps is equal to $t_2$. Hence, there are twenty steps in the cycle, and the mode of operation for each bed is offset by two steps.

The 10-3-5 PSA cycle sequence is now described with respect to one bed which undergoes the entire PSA cycle (i.e., CT). A representative PSA train/skid system having ten beds in parallel is depicted in FIG. 3, and is employed herein to illustrate this embodiment. The system includes 60 on/off valves, and 22 control valves, 7 manifolds and associate pipings and fitting. The control valves are utilized to control the flow rate or pressure during certain process steps while the on/off valves allow communication between the various beds in the PSA system. The valve nomenclature utilized is such that the first two digits in the valve tag number correspond to bed number and the last digit designates the manifold number. By cross-referencing the bed and manifold designation each valve has a unique tag number—these valves are referred to as cycling valves. For purposes of clarity, valve tag numbers starting with two zeros such as product pressure control valve 002 or repressurization control valve 007 are not associated with any of the beds—process valves.

The valve sequencing representing the steps in the 10-3-5 PSA cycle of FIG. 3 is illustrated in Table 3, below, where the valve chart defines the position or action for each valve (i.e., open=O, closed=C, and CV=control valve in open position employing positioned to vary flow rate) in a particular step of the PSA cycle.

TABLE 3

10-3-5 PSA cycle valve chart

| | Step # | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| XV-007 | C | CV | C | CV | C | CV | C | CV | C | CV | C | CV | C | CV | C | CV | C | CV | C | CV |
| XV-002 | CV | CV | CV | CV | CV | CV | CV | CV | CV | CV | CV | CV | CV | CV | CV | CV | CV | CV | CV | CV |
| XV-011 | O | O | O | O | O | O | C | C | C | C | C | C | C | C | C | C | C | C | C | C |
| XV-012 | O | O | O | O | O | O | C | C | C | C | C | C | C | C | C | C | C | C | C | C |
| XV-013 | C | C | C | C | C | C | C | C | C | C | C | O | C | O | C | C | C | C | C | C |
| XV-014 | C | C | C | C | C | C | C | C | C | C | C | C | CV | CV | C | C | C | C | C | C |
| XV-015 | C | C | C | C | C | C | C | C | C | O | O | C | C | C | O | O | C | C | C | C |
| XV-016 | C | C | C | C | C | C | C | O | O | C | C | C | C | C | C | C | O | O | C | C |
| XV-017 | C | C | C | C | C | C | O | C | C | C | C | C | C | C | C | C | C | C | O | O |
| XV-018 | C | C | C | C | C | C | CV | CV | CV | CV | CV | CV | C | O | O | O | O | O | O | O |
| XV-021 | C | C | O | O | O | O | O | O | C | C | C | C | C | C | C | C | C | C | C | C |
| XV-022 | C | C | O | O | O | O | O | O | C | C | C | C | C | C | C | C | C | C | C | C |
| XV-023 | C | C | C | C | C | C | C | C | C | C | C | C | C | O | C | O | C | C | C | C |
| XV-024 | C | C | C | C | C | C | C | C | C | C | C | C | C | CV | CV | C | C | C | C | C |
| XV-025 | C | C | C | C | C | C | C | C | C | C | C | O | O | C | C | C | O | O | C | C |
| XV-026 | C | C | C | C | C | C | C | C | C | O | O | C | C | C | C | C | C | C | O | O |
| XV-027 | O | O | C | C | C | C | C | C | C | O | C | C | C | C | C | C | C | C | C | C |
| XV-028 | O | O | C | C | C | C | C | C | CV | CV | CV | CV | CV | CV | C | O | O | O | O | O |
| XV-031 | C | C | C | C | O | O | O | O | O | O | C | C | C | C | C | C | C | C | C | C |
| XV-032 | C | C | C | C | O | O | O | O | O | O | C | C | C | C | C | C | C | C | C | C |
| XV-033 | C | C | C | C | C | C | C | C | C | C | C | C | C | C | O | C | O | C | C | C |
| XV-034 | C | C | C | C | C | C | C | C | C | C | C | C | C | C | C | C | CV | CV | C | C |
| XV-035 | C | C | C | C | C | C | C | C | C | C | C | C | O | O | C | C | C | O | O | C |
| XV-036 | O | O | C | C | C | C | C | C | C | C | C | O | O | C | C | C | C | C | C | C |
| XV-037 | C | C | O | O | C | C | C | C | C | C | O | C | C | C | C | C | C | C | C | C |
| XV-038 | O | O | O | O | C | C | C | C | C | C | CV | CV | CV | CV | CV | CV | C | O | O | O |
| XV-041 | C | C | C | C | C | C | O | O | O | O | O | O | C | C | C | C | C | C | C | C |
| XV-042 | C | C | C | C | C | C | O | O | O | O | O | O | C | C | C | C | C | C | C | C |
| XV-043 | C | C | C | C | C | C | C | C | C | C | C | C | C | C | C | C | C | O | C | O |
| XV-044 | C | C | C | C | C | C | C | C | C | C | C | C | C | C | C | C | C | C | CV | CV |
| XV-045 | O | O | C | C | C | C | C | C | C | C | C | C | C | C | O | O | C | C | C | C |
| XV-046 | C | C | O | O | C | C | C | C | C | C | C | C | C | O | O | C | C | C | C | C |
| XV-047 | C | C | C | C | O | O | C | C | C | C | C | C | O | C | C | C | C | C | C | C |
| XV-048 | O | O | O | O | O | O | C | C | C | C | C | C | CV | CV | CV | CV | CV | CV | C | O |
| XV-051 | C | C | C | C | C | C | C | C | O | O | O | O | O | O | C | C | C | C | C | C |
| XV-052 | C | C | C | C | C | C | C | O | O | O | O | O | O | C | C | C | C | C | C | C |
| XV-053 | C | O | C | C | C | C | C | C | C | C | C | C | C | C | C | C | C | C | C | O |
| XV-054 | CV | CV | C | C | C | C | C | C | C | C | C | C | C | C | C | C | C | C | C | C |
| XV-055 | C | C | O | O | C | C | C | C | C | C | C | C | C | C | C | C | C | O | O | C |
| XV-056 | C | C | C | O | O | O | C | C | C | C | C | C | C | C | O | O | C | C | C | C |
| XV-057 | C | C | C | C | C | O | O | O | C | C | C | C | C | C | O | C | C | C | C | C |
| XV-058 | C | O | O | O | O | O | O | O | C | C | C | C | CV | CV | CV | CV | CV | CV | CV | CV |
| XV-061 | C | C | C | C | C | C | C | C | C | C | O | O | O | O | O | C | C | C | C | C |
| XV-062 | C | C | C | C | C | C | C | C | C | O | O | O | O | O | C | C | C | C | C | C |
| XV-063 | C | O | C | O | C | C | C | C | C | C | C | C | C | C | C | C | C | C | C | C |
| XV-064 | C | C | CV | CV | C | C | C | C | C | C | C | C | C | C | C | C | C | C | C | C |
| XV-065 | O | C | C | C | O | O | C | C | C | C | C | C | C | C | C | C | C | C | C | O |

TABLE 3-continued 10-3-5 PSA cycle valve chart

| | Step # | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| XV-066 | C | C | C | C | C | C | O | O | C | C | C | C | C | C | C | C | C | O | O | C |
| XV-067 | C | C | C | C | C | C | C | O | O | C | C | C | C | C | C | O | C | C | C | C |
| XV-068 | CV | CV | C | O | O | O | O | O | O | O | C | C | C | C | C | C | CV | CV | CV | CV |
| XV-071 | C | C | C | C | C | C | C | C | C | C | C | C | O | O | O | O | O | O | C | C |
| XV-072 | C | C | C | C | C | C | C | C | C | C | C | C | O | O | O | O | O | O | C | C |
| XV-073 | C | C | C | O | C | O | C | C | C | C | C | C | C | C | C | C | C | C | C | C |
| XV-074 | C | C | C | C | CV | CV | C | C | C | C | C | C | C | C | C | C | C | C | C | C |
| XV-075 | C | O | O | C | C | C | O | O | C | C | C | C | C | C | C | C | C | C | C | C |
| XV-076 | O | C | C | C | C | C | C | C | O | O | C | C | C | C | C | C | C | C | C | O |
| XV-077 | C | C | C | C | C | C | C | C | C | O | O | C | C | C | C | C | C | C | O | C |
| XV-078 | CV | CV | CV | CV | C | O | O | O | O | O | O | O | C | C | C | C | C | C | CV | CV |
| XV-081 | C | C | C | C | C | C | C | C | C | C | C | C | C | O | O | O | O | O | O | O |
| XV-082 | C | C | C | C | C | C | C | C | C | C | C | C | C | C | O | O | O | O | O | O |
| XV-083 | C | C | C | C | C | O | C | O | C | C | C | C | C | C | C | C | C | C | C | C |
| XV-084 | C | C | C | C | C | C | CV | CV | C | C | C | C | C | C | C | C | C | C | C | C |
| XV-085 | C | C | C | O | O | C | C | C | O | O | C | C | C | C | C | C | C | C | C | C |
| XV-086 | C | O | O | C | C | C | C | C | C | C | O | O | C | C | C | C | C | C | C | C |
| XV-087 | O | C | C | C | C | C | C | C | C | C | C | C | O | O | C | C | C | C | C | C |
| XV-088 | CV | CV | CV | CV | CV | CV | C | O | O | O | O | O | O | O | C | C | C | C | C | C |
| XV-091 | O | O | O | C | C | C | C | C | C | C | C | C | C | C | C | O | O | O | O | O |
| XV-092 | O | O | C | C | C | C | C | C | C | C | C | C | C | C | C | O | O | O | O | O |
| XV-093 | C | C | C | C | C | C | C | O | C | O | C | C | C | C | C | C | C | C | C | C |
| XV-094 | C | C | C | C | C | C | C | C | CV | CV | C | C | C | C | C | C | C | C | C | C |
| XV-095 | C | C | C | C | C | O | O | C | C | O | O | C | C | C | C | C | C | C | C | C |
| XV-096 | C | C | C | O | O | C | C | C | C | C | C | C | O | O | C | C | C | C | C | C |
| XV-097 | C | C | O | C | C | C | C | C | C | C | C | C | C | O | O | C | C | C | C | C |
| XV-098 | C | C | CV | CV | CV | CV | CV | CV | C | O | O | O | O | O | O | C | C | C | C | C |
| XV-101 | O | O | O | O | C | C | C | C | C | C | C | C | C | C | C | C | C | C | O | O |
| XV-102 | O | O | O | O | C | C | C | C | C | C | C | C | C | C | C | C | C | C | O | O |
| XV-103 | C | C | C | C | C | C | C | C | O | C | O | C | C | C | C | C | C | C | C | C |
| XV-104 | C | C | C | C | C | C | C | C | C | C | CV | CV | C | C | C | C | C | C | C | C |
| XV-105 | C | C | C | C | C | C | O | O | C | C | C | O | O | C | C | C | C | C | C | C |
| XV-106 | C | C | C | C | O | O | C | C | C | C | C | C | O | O | C | C | C | C | C | C |
| XV-107 | C | C | C | C | O | C | C | C | C | C | C | C | C | C | O | O | C | C | C | C |
| XV-108 | C | C | C | C | CV | CV | CV | CV | CV | CV | C | O | O | O | O | O | O | O | C | C |

Step Nos. 1-6 (A1-A6): The feed gas mixture is introduced to the bottom of Bed 1 from the first manifold (i.e., feed manifold) at high pressure. The process cycle commences in the adsorption step one (i.e., A1). Both valves 011 (i.e., XV-011) and 012 (i.e., XV-012) are open while all other Bed 1 valves (e.g., 01x) are closed. Hereinafter, valve tag numbers will be referred to without using the prefix XV. In addition to Bed 1, Bed 9 and Bed 10 are processing the feed in the first step. As a result, valves 091, 092, 101 and 102 will be open, as well. The feed mixture flows from the bottom to the top of Bed 1 (although this is also the case for Bed 9 and Bed 10 in step 1). This upward flow direction in the vessel will be referred to as co-current flow with respect to feed. During adsorption step, the impurities are adsorbed on to the adsorbents and high purity hydrogen is collected in the second product manifold. Control valve 002 is used to control the pressure in beds in the adsorption or feed/production step. Bed 1 remains in the adsorption step during the steps one through six of the 10-3-5 cycle.

Step No. 7 (E1): Bed 1 undergoes the first bed-to-bed equalization step (E1) while the Bed 5 is counter-currently receiving the equalization gas—step (E1') via the first manifold. See FIG. 3. This bed-to-bed equalization step is sometimes referred to as co-current depressurization step. Bed 1 valves 017, 018 and Bed 5 valves 057 and 058 are open while all other Bed 1 and Bed 5 valves (01x) and (05x) are closed. The rate of (E1)-(E1') steps is controlled by control valve 018.

Step No. 8 (E2): Bed 1 undergoes the second equalization step (E2). Bed 1 pressure drops due to co-current gas flow from Bed 1 to Bed 6 undergoing step (E2') via the sixth manifold. The pressures in both beds are equal at the end of this Step No. 8. Valves 016, 066 and 068 are fully open while valve 018 controls the rate of (E2)-(E2') steps.

Step No. 9 (E3): Bed 1 executes the third equalization down step (E3). This step uses equalization manifold number six dedicated for the second and third equalization steps of the 10-3-5 cycle. Valves 016, 076 and 078 are fully open while valve 018 controls the rate of (E3)-(E3') steps.

Step No. 10 (E4): Bed 1 executes the fourth equalization step (E4) sending the gas to Bed 8. Valves 015, 085 and 088 are fully open while valve 018 controls the rate of (E4)-(E4') steps.

Step No. 11 (E5): Bed 1 executes the fifth equalization down step (E5). This step uses equalization manifold number five dedicated for the fourth and fifth equalization steps of the 10-3-5 cycle. Valves 015, 095 and 098 are fully open while valve 018 controls the rate of (E5)-(E5') steps.

Step No. 12 (PPG): In this step, Bed 1 co-currently sends the purge gas to the bed in the purge step (PG). As shown in Table 2, above, the bed being purged in during this step is Bed 10. Valve 013 is open and the control valve 018 is used to control the rate of this provide purge step.

Step No. 13 (BD): The purpose of this step is to rid the vessel of the impurities adsorbed during co-current steps (AD, EQ, PPG) through the bottom of the vessel. At this point in cycle, the pressure in the vessel is too low to hold on to the impurities. As a result, they are desorbed and counter-currently directed to the surge drum through valve 014. All other valves associated with Bed 1 are closed during this step.

Step No. 14 (PG): As designated in Table 2, this is the purge step (PG). Bed 1 is receiving the purge gas from the bed in (PPG) step (i.e., Bed 2). Valves 013, 018 are fully open, and the bed pressure during the purge step is controlled by valve 014.

Step No. 15 (E5'): The first equalization up step is designated as (E5') to reference the bed receiving the gas. The beds in (E5) and (E5') steps are interacting such that the content of Bed 3 is transferred to Bed 1 until the pressures in both beds are equalized. Valves 035, 015 and 018 are fully open and the action of control valve 038 provides means to control the rate of this step.

Step No. 16 (E4'): Is the second equalization up step. The beds in (E4) and (E4') steps are interacting such that the content of Bed 4 is transferred to Bed 1 until the pressures in both beds are equalized. Valves 045, 015 and 018 are fully open and the action of control valve 048 provides means to control the rate of this step.

Step No. 17 (E3'): In this third equalization up step, Bed 1 is receiving gas from Bed 5 via the sixth manifold. Valves 016, 056 and 018 are fully open and the action of control valve 058 provides the means to control the rate.

Step No. 18 (E2'): In this step, Bed 1 is receiving gas from bed 6 via the sixth manifold. Valves 016, 066 and 018 are fully open and the action of control valve 068 provides means to control the rate.

Step No. 19 (E1'): In this last equalization step Bed 1 receives the gas from Bed 7. Valves 017, 077 and 018 are fully open and the action of control valve 078 provides means to control the rate.

Step No. 20 (PP): The last step in the cycle for Bed 1 is the product pressurization (PP) step, where portion of the product gas from the second manifold is employed to further raise the pressure in the bed by using the control valve 007. Valves 017 and 018 are fully open during this step.

Basic functionality of the cycle can be described in the same fashion for each one of the ten beds in the PSA system. However, once the step sequence for one bed is defined the step sequences for other beds will follow in the same order and the relative time shift will be 1/10th of CT or ($t_1+t_2$) (i.e., Bed 2 starts the first adsorption (A1) in the third step as compared to Bed 1 that undergoes the first adsorption (A1) in the first step).

The performance for PSA system operating in the 10-3-5 cycle was obtained via mathematical modeling. The results are summarized in Table 4. The model assumed following feed gas composition for all cycles: 73.87% hydrogen, 0.23% nitrogen, 3.31% carbon monoxide, 16.37% carbon dioxide, 5.94% methane and 0.3% water. The feed gas temperature was 100° F. and feed gas pressure was 360 psig.

TABLE 4

| $H_2$ PSA cycles and corresponding process performance | |
|---|---|
| PSA Cycle | 10-3-5 |
| Cycle Time [min] | 7.2 |
| High Pressure [Psig] | 360 |
| Low Pressure [Psig] | 5.0 |
| Temperature [K] | 310 |
| Bed ID [ft] | 12.5 |
| Feed Rate [MMSCFD] | 155.3 |
| $H_2$ Product Rate [MMSCFD] | 104.4 |
| Total BSF [lbs/TPD $H_2$] | 3,630 |
| $H_2$ Purity [%] | 99.999 |
| $H_2$ Recovery [%] | 91 |

Note 1: MMSCFD represents million standard cubic feet per day of gas where assumed standard conditions are 1 atmosphere pressure and temperature 70° F.;

Note 2: 1 psig is a unit of pressure corresponding to 6894.757 Pascal; 1 lbs is a mass unit corresponding to 0.4535924 kg; K correspond to SI units for temperature of 1 Kelvin; ft represents distance 1 feet equal to 0.3048 meters;

Note 3: TPD $H_2$ represents tons (2000 lbs) of hydrogen per day; and

Note 4: BSF (bed size factor) is the ratio of total mass of adsorbents in all beds and daily production of hydrogen in tons per days (see Note 3);

As shown in Table 4, the recovery for the 10-3-5 cycle is 91%. This is three percentage points higher compared to prior art 10-2-4 cycle discussed in Xu et al (U.S. Pat. No. 6,379,431 B1). See Tables 2 and 9. This enhanced hydrogen recovery translates into millions of dollars of additional gas produced and sold on a yearly basis.

During the operation of a plant employing a ten bed PSA system, it may be desirable to operate the plant in the turndown mode for a limited period of time. In the case of a ten bed/vessels PSA system, this mode enables the continuous production with only nine vessels online while one of the beds or valves associated with a given bed failed and need to be serviced. While it is often seen in the industry that the plant performance significantly deteriorates when operating in this exceptional mode, the inventive cycle provides a lesser reduction in hydrogen production. With reference to Table 4, below, the mode of operation of the new 9-3-4 PSA cycle is described.

TABLE 5

9-3-4 PSA cycle chart (10 Bed $H_2$ PSA System Turndown to 9 Bed Mode of Operation)

| Bed # | Step: | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| 1 | A1 | A2 | A3 | A4 | A5 | A6 | E1 | E2 | E3 | E4 | PPG | BD | PG | E4' | E3' | E2' | E1' | PP |
| 2 | E1' | PP | A1 | A2 | A3 | A4 | A5 | A6 | E1 | E2 | E3 | E4 | PPG | BD | PG | E4' | E3' | E2' |
| 3 | E3' | E2' | E1' | PP | A1 | A2 | A3 | A4 | A5 | A6 | E1 | E2 | E3 | E4 | PPG | BD | PG | E4 |
| 4 | PG | E4' | E3' | E2' | E1' | PP | A1 | A2 | A3 | A4 | A5 | A6 | E1 | E2 | E3 | E4 | PPG | BD |
| 5 | PPG | BD | PG | E4' | E3' | E2' | E1' | PP | A1 | A2 | A3 | A4 | A5 | A6 | E1 | E2 | E3 | E4 |
| 6 | E3 | E4 | PPG | BD | PG | E4' | E3' | E2' | E1' | PP | A1 | A2 | A3 | A4 | A5 | A6 | E1 | E2 |
| 7 | E1 | E2 | E3 | E4 | PPG | BD | PG | E4' | E3' | E2' | E1' | PP | A1 | A2 | A3 | A4 | A5 | A6 |
| 8 | A5 | A6 | E1 | E2 | E3 | E4 | PPG | BD | PG | E4' | E3' | E2' | E1' | PP | A1 | A2 | A3 | A4 |
| 9 | A3 | A4 | A5 | A6 | E1 | E2 | E3 | E4 | PPG | BD | PG | E4' | E3' | E2' | E1' | PP | A1 | A2 |

The 9-3-4 PSA cycle has eighteen steps. Utilizing nine beds, the unit block is defined by the duration of two steps assigned as $t_1$ and $t_2$. Therefore, the total cycle is $9*(t_1+t_2)$. The cycle sequence will be described bellow in detail with respect to Bed 1 for illustration purposes assuming that Bed 10 is offline and completely isolated from the rest of the process. Functionality of the cycle is explained using the hydrogen PSA process valve skid shown in FIG. 3. The 9-3-4 PSA cycle sequence is now described with reference to Table 5, and references the operations of all beds in the particular steps.

Step No. 1: Three beds, namely Bed 1, 8 and 9 are in the adsorption/feed step (A1, A5, A3, respectively). It follows that valves 011, 012, 081, 082, 091 and 092 will be in an open position. Bed 7 and Bed 2 are interacting such that Bed 7 is sending equalization gas to Bed 2 through the seventh manifold. To accomplish these (E1)-(E1') bed-to-bed equalization, valves 077, 027, 028 are open and valve 078 is used to control the rate. Bed 6 undergoing the third equalization step down (E3) is sending/routing gas to Bed 3 via the fifth manifold. Valves 065, 035, 038 are open and valve 068 controls the rate of (E3)-(E3') equalization. Bed 5, in the meantime, provides purge gas and purges Bed 4. The rate of the (PPG) step is controlled by valve 058. Valves 053, 043, 048 are fully open and valve 044 controls the pressure in Bed 4.

Step No. 2: Three beds, namely Bed 1, 8 and 9 are in the adsorption/process of feed (A2, A6, and A4, respectively). It follows that valves 011, 012, 081, 082, 091 and 092 will be in an open position. Bed 2 is in product pressurization step (PP) where part of the product gas is recycled back to the process via the seventh manifold to raise the pressure in Bed 2. Valves 027 and 028 are open while valve 007 controls the rate of this step. Bed 7 and bed 3 are interacting such that Bed 7 is sending/routing equalization gas to Bed 3 via the sixth manifold. To achieve (E2)-(E2') bed-to-bed equalization, valves 076, 036, 038 are open and valve 078 is used to control the rate. Bed 6 is in the (E4) step sending gas to Bed 4 through the fifth manifold. Valves 065, 045, 048 are open and valve 068 is used to control the rate. Bed 5 is in blowdown (BD) mode in this Step No. 2 of the 9-3-4 cycle. The desorbed impurities exit the bed through control valve 054.

Step No. 3: Features the same bed, valve and manifold interactions as in Step No. 1. Thus, in Step No. 3, Bed 2, 9 and 1 are in the adsorption phase where—valves 021, 022, 091, 092, 011 and 012 are open; (E1)-(E1') equalization steps of Bed 8 and Bed 3—valves 087, 037, 038 are open and valve 088 is used to control the rate; (E3)-(E3') equalization step between Bed 7 and Bed 4—valves 075, 045, 048 are open and valve 078 controls the rate; (PPG)—(PG) step between Bed 6 and Bed 5—where valves 068; 063, 053, 058 and control valve 054 is employed to control the rate.

Should the PSA system need to further turndown, and isolate an additional bed, a newly designed 8-3-3 cycle is employed. In this embodiment, the cycle has sixteen steps with three parallel feeds and three bed-to-bed equalization steps. Since eight beds are employed in the sixteen step cycle the unit block duration will be two steps long $(t_1+t_2)$. Thus, the basic functionality of the cycle is illustrated with reference to Table 6 and FIG. 3.

TABLE 6

8-3-3 Cycle Chart (10 Bed $H_2$ PSA System Turndown to 8 Bed Mode of Operation)

| Bed # | Step: | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 1 | A1 | A2 | A3 | A4 | A5 | A6 | E1 | E2 | E3 | PPG | BD | PG | E3' | E2' | E1' | PP |
| 2 | E1' | PP | A1 | A2 | A3 | A4 | A5 | A6 | E1 | E2 | E3 | PPG | BD | PG | E3' | E2' |
| 3 | E3' | E2' | E1' | PP | A1 | A2 | A3 | A4 | A5 | A6 | E1 | E2 | E3 | PPG | BD | PG |
| 4 | BD | PG | E3' | E2' | E1' | PP | A1 | A2 | A3 | A4 | A5 | A6 | E1 | E2 | E3 | PPG |
| 5 | E3 | PPG | BD | PG | E3' | E2' | E1' | PP | A1 | A2 | A3 | A4 | A5 | A6 | E1 | E2 |
| 6 | E1 | E2 | E3 | PPG | BD | PG | E3' | E2' | E1' | PP | A1 | A2 | A3 | A4 | A5 | A6 |
| 7 | A5 | A6 | E1 | E2 | E3 | PPG | BD | PG | E3' | E2' | E1' | PP | A1 | A2 | A3 | A4 |
| 8 | A3 | A4 | A5 | A6 | E1 | E2 | E3 | PPG | BD | PG | E3' | E2' | E1' | PP | A1 | A2 |

Step No. 1: Three beds are processing feed (i.e., are in the adsorption step), namely Beds 1, 7 and 8. During this step, valves 011, 012, 071, 072, 081 and 082 are open. Bed 6 and Bed 2 are in communication executing the equalization (E1)-(E1') step, while valves 067, 027, 028 are open and valve 068 is employed to control the rate. Bed 5 meanwhile is undergoing the third equalization step down (E3) by sending gas to Bed 3 in the (E3') step. Valves 055, 035, 038 are open and valve 058 controls the rate of (E3)-(E3') equalization. Bed 4 during this step is in blowdown (BD) mode/step. The desorbed impurities exit the bed through control valve 044.

Step No. 2: Three beds are processing feed (i.e., are in the adsorption step), namely Beds 1, 7 and 8. It follows that the valves 011, 012, 071, 072, 081 and 082 will be open. Bed 2 is in product pressurization step (PP). Valves 027 and 028 are open while valve 007 controls the rate of this step. Bed 6 and Bed 3 are in the equalization (E2)-(E2') steps. Valves 067, 037, 038 are open and valve 068 is used to control the rate. Bed 5 is providing the purge gas (PPG1) to purge the Bed 4 (PG1). The rate of the (PPG1) step is controlled by valve 058, while valves 053, 043, 048 are fully open and valve 044 controls the pressure in Bed 4.

In the next step of a turndown, the PSA system reduces the operating beds to seven. The seven bed mode of operation utilizes a novel 7-2-3 cycle as summarized in Table 7. It's a twenty-one step cycle with two parallel feeds and three bed-to-bed equalization steps. Since seven beds are utilized in twenty one step cycle the unit block duration will be three steps long $(t_1+t_2+t_3)$. Basic functionality will be illustrated using Table 7 and FIG. 3, and discussed with respect to steps 1-3 for a complete cycle definition.

TABLE 7

7-2-3 Cycle Chart (10 Bed H$_2$ PSA System Turndown to 7 Bed Mode of Operation)

| Bed # | Step: 1 | 2 | 3 | 4 | 5 | 6 | 7 | 8 | 9 | 10 | 11 |
|---|---|---|---|---|---|---|---|---|---|---|---|
| 1 | A1 | A2 | A3 | A4 | A5 | A6 | E1 | E1 | E2 | PPG1 | E3 |
| 2 | E1' | E1' | PP | A1 | A2 | A3 | A4 | A5 | A6 | E1 | E1 |
| 3 | PG1 | E3' | E2' | E1' | E1' | PP | A1 | A2 | A3 | A4 | A5 |
| 4 | BD1 | BD2 | PG2 | PG1 | E3' | E2' | E1' | E1' | PP | A1 | A2 |
| 5 | PPG1 | E3 | PPG2 | BD1 | BD2 | PG2 | PG1 | E3' | E2' | E1' | E1' |
| 6 | E1 | E1 | E2 | PPG1 | E3 | PPG2 | BD1 | BD2 | PG2 | PG1 | E3' |
| 7 | A4 | A5 | A6 | E1 | E1 | E2 | PPG1 | E3 | PPG2 | BD1 | BD2 |

| Bed # | Step: 12 | 13 | 14 | 15 | 16 | 17 | 18 | 19 | 20 | 21 |
|---|---|---|---|---|---|---|---|---|---|---|
| 1 | PPG2 | BD1 | BD2 | PG2 | PG1 | E3' | E2' | E1' | E1' | PP |
| 2 | E2 | PPG1 | E3 | PPG2 | BD1 | BD2 | PG2 | PG1 | E3' | E2' |
| 3 | A6 | E1 | E1 | E2 | PPG1 | E3 | PPG2 | BD1 | BD2 | PG2 |
| 4 | A3 | A4 | A5 | A6 | E1 | E1 | E2 | PPG1 | E3 | PPG2 |
| 5 | PP | A1 | A2 | A3 | A4 | A5 | A6 | E1 | E1 | E2 |
| 6 | E2' | E1' | E1' | PP | A1 | A2 | A3 | A4 | A5 | A6 |
| 7 | PG2 | PG1 | E3' | E2' | E1' | E1' | PP | A1 | A2 | A3 |

Step No. 1: Two beds are processing feed (i.e., are in the adsorption step), namely Bed 1 and Bed 7. As a result, valves 011, 012, 071 and 072 are open. Bed 6 and Bed 2 are in communication, executing the (E1)-(E1') equalization step, while valves 067, 027, 028 are open and valve 068 is employed to control the rate. Bed 5 is providing the purge gas (PPG1) to purge Bed 3 (PG1). The rate of the (PPG1) step is controlled by valve 058, and valves 053, 033, 038 are fully open while valve 034 controls the pressure in Bed 3. Meanwhile, Bed 4 is in blowdown (BD1) step. The desorbed impurities exit the bed through control valve 044.

Step No. 2: Two beds are processing feed (adsorption step), namely Bed 1 and Bed 7. As a result, valves 011, 012, 071 and 072 are open. Bed 6 and Bed 2 are in communication executing (E1)-(E1') steps, while valves 067, 027, 028 are open and valve 068 is used to control the rate. Bed 5 and Bed 3 are in (E3)-(E3') steps, while valves 055, 035, 038 are open and valve 058 is employed to control the rate. Bed 4 is in blowdown (BD2) step. The desorbed impurities exit the bed through control valve 044.

Step No. 3: Two beds are processing feed (adsorption step), namely Bed 1 and Bed 7. Consequently, valves 011, 012, 071 and 072 are open. Bed 2 is in the product pressurization step (PP). Valves 027 and 028 are open while valve 007 controls the rate of this step. Bed 6 and Bed 3 are in the (E2)-(E2') steps, while valves 065, 035, 038 are open and valve 068 is employed to control the rate. Bed 5 is providing the purge gas (PPG2) to purge the Bed 4 (PG2). The rate of the (PPG2) step is controlled by valve 058. Valves 053, 043, 048 are fully open and valve 044 controls the pressure in Bed 4 (i.e., during the (PG2) step).

In the following turndown, a six bed PSA system is employed. The six bed mode of operation will employs the novel 6-2-3 cycle summarized in Table 8, below. The cycle is eighteen steps with two parallel feeds and three bed-to-bed equalization steps. Since six beds are engaged with an eighteen step cycle (18÷6), three cycle steps and their times ($t_1$, $t_2$, $t_3$) must be described for full cycle definition. Basic functionality will be illustrated using Table 8 and FIG. 3.

TABLE 8

6-2-3 Cycle Chart (10 Bed H$_2$ PSA System Turndown to 6 Bed Mode of Operation)

| Bed # | Step: 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | A1 | A2 | A3 | A4 | A5 | A6/PP | E1 | E1 | E2 | PPG | E3/BD1 | BD2 | PG | E3' | E2' | E1' | E1' | PP |
| 2 | E1' | E1' | PP | A1 | A2 | A3 | A4 | A5 | A6/PP | E1 | E1 | E2 | PPG | E3/BD1 | BD2 | PG | E3' | E2' |
| 3 | PG | E3' | E2' | E1' | E1' | PP | A1 | A2 | A3 | A4 | A5 | A6/PP | E1 | E1 | E2 | PPG | E3/BD1 | BD2 |
| 4 | PPG | E3/BD1 | BD2 | PG | E3' | E2' | E1' | E1' | PP | A1 | A2 | A3 | A4 | A5 | A6/PP | E1 | E1 | E2 |
| 5 | E1 | E1 | E2 | PPG | E3/BD1 | BD2 | PG | E3' | E2' | E1' | E1' | PP | A1 | A2 | A3 | A4 | A5 | A6/PP |
| 6 | A4 | A5 | A6/PP | E1 | E1 | E2 | PPG | E3/BD1 | BD2 | PG | E3' | E2' | E1' | E1' | PP | A1 | A2 | A3 |

Step No. 1: Two beds are processing feed (adsorption step), namely Bed 1 and Bed 6. It follows that the valves 011, 012, 061 and 062 are open. Bed 5 and Bed 2 are in communication executing (E1)-(E1') steps, while valves 057, 027, 028 are open and valve 058 is employed to control the rate. Bed 4 is providing the purge gas (PPG) to purge Bed 3 (PG). The rate of the (PPG) step is controlled by valve 048. Meanwhile valves 043, 033, 038 are fully open and valve 034 is utilized to control the pressure in Bed 3.

Step No. 2: Two beds are processing feed (adsorption step), namely Bed 1 and Bed 6. Therefore, valves 011, 012, 061 and 062 are open. Bed 5 and Bed 2 are continuing in equalization steps (E1)-(E1'), and valves 057, 027, 028 are open, while valve 058 is used to control the rate. Bed 4 and Bed 3 are undergoing (E3/BD1)-(E3') steps (i.e., overlapping low pressure equalization step and blowdown). Valves 045, 035, 038 are open and valve 048 is used to control the rate of (E3) step to Bed 3. At the same time, Bed 4 is blown down through valve 044 and (BD1) step gas is directed towards the surge drum via the fourth manifold.

In Step No. 3, two beds are processing feed (adsorption step), namely Beds 1 and Bed 6, while valves 011, 012, 061 and 062 are in the open position. Bed 2 is in the product pressurization step (PP). Valves 027 and 028 are open while valve 007 controls the rate of this step. Bed 5 and Bed 3 are in communication executing the (E2)-(E2') steps. Valves 055, 035, 038 are open and valve 058 is used to control the rate. Bed 4 is in the blowdown (BD2) step, when the bed is countercurrently depressurized and its content is released to the surge drum through valve 044 and the fourth manifold.

The five bed mode of operation, the PSA system utilizes a novel 5-2-2 cycle which is summarized in Table 9, below. The five bed mode is considered to be the last turndown mode for a ten bed PSA system. It's a fifteen step cycle with two parallel feeds and two bed-to-bed equalization steps. Since five beds are used with a fifteen step cycle (15÷5), three cycle steps and their times ($t_1$, $t_2$, $t_3$) must be described for full cycle definition. Basic functionality is illustrated using Table 9 and FIG. 3.

an open position. Bed 4 and Bed 2 are in communication executing (E1)-(E1') steps, while valves 047, 027, 028 are open. In the meantime, valve 048 is used to control the rate. Bed 3 is in blowdown (BD) step, and the desorbed impurities exit the bed through control valve 034.

Step No. 2: Two beds are processing feed (adsorption step), namely Beds 1 and Bed 5, while valves 011, 012, 051 and 052 are open. Bed 2 is in the product pressurization step (PP). Valves 027 and 028 are open, while valve 007 controls the rate of this step. Bed 4 is providing the purge gas (PPG) to purge the Bed 3 (PG). The rate of the (PPG) step is controlled by valve 048, while valves 043, 033, 038 are fully open and valve 034 is used to control the pressure in Bed 3.

Step No. 3: Two beds are processing feed (adsorption step), namely Bed 1 and Bed 5. As a result, valves 011, 012, 051 and 052 are open. Bed 2 is in the product pressurization step (PP). Valves 027 and 028 are open while valve 007 controls the flow rate of this step. Bed 4 and Bed 3 are in the (E2)-(E2') steps, with valves 047, 037, 038 in the open position and valve 048 employed to control the rate.

In addition to PSA process cycles described above, alternative cycles can offer better process performance in certain situations. For example, pressure ratio of the process high and low pressure values different than usual ones (approx. 20) or temporary demand for higher hydrogen production can be satisfied by utilization of 10-4-3 cycle instead of the preferred 10-3-5 cycle described above.

The alternative and novel 10-2-5 PSA cycle has twenty steps and utilizes ten beds. The unit block is defined by duration of two steps $t_1+t_2$ and $CT=10^*(t_1+t_2)$. The cycle features two parallel feeds and five bed-to-bed equalizations. By describing all events and interactions for the first two steps

TABLE 9

5-2-2 Cycle Chart (10 Bed H₂ PSA System Turndown to 5 Bed Mode of Operation)

| Bed # | Step: | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 1 | A1 | A2 | A3 | A4 | A5/PP1 | A6/PP2 | E1 | PPG | E2 | BD | PG | E2' | E1' | PP1 | PP2 |
| 2 | E1' | PP1 | PP2 | A1 | A2 | A3 | A4 | A5/PP1 | A6/PP2 | E1 | PPG | E2 | BD | PG | E2' |
| 3 | BD | PG | E2' | E1' | PP1 | PP2 | A1 | A2 | A3 | A4 | A5/PP1 | A6/PP2 | E1 | PPG | E2 |
| 4 | E1 | PPG | E2 | BD | PG | E2' | E1' | PP1 | PP2 | A1 | A2 | A3 | A4 | A5/PP1 | A6/PP2 |
| 5 | A4 | A5/PP1 | A6/PP2 | E1 | PPG | E2 | BD | PG | E2' | E1' | PP1 | PP2 | A1 | A2 | A3 |

Step No. 1: Two beds are processing feed (adsorption step), namely Bed 1 and Bed 5. Valves 011, 012, 051 and 052 are in the cycle will be fully defined. FIG. 3 together with Table 10, below, are utilized to illustrate the cycle.

TABLE 10

10-2-5 Cycle Chart (Alternative 10 Bed H₂ PSA System Operation)

| Bed # | Step: | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| 1 | A1 | A2 | A3 | A4 | E1 | E2 | E3 | E4 | E5 | PPG1 | PPG2 | BD | PG2 | PG1 | E5' | E4' | E3' | E2' | E1' | PP |
| 2 | E1' | PP | A1 | A2 | A3 | A4 | E1 | E2 | E3 | E4 | E5 | PPG1 | PPG2 | BD | PG2 | PG1 | E5' | E4' | E3' | E2' |
| 3 | E3' | E2' | E1' | PP | A1 | A2 | A3 | A4 | E1 | E2 | E3 | E4 | E5 | PPG1 | PPG2 | BD | PG2 | PG1 | E5' | E4' |
| 4 | E5' | E4' | E3' | E2' | E1' | PP | A1 | A2 | A3 | A4 | E1 | E2 | E3 | E4 | E5 | PPG1 | PPG2 | BD | PG2 | PG1 |
| 5 | PG2 | PG1 | E5' | E4' | E3' | E2' | E1' | PP | A1 | A2 | A3 | A4 | E1 | E2 | E3 | E4 | E5 | PPG1 | PPG2 | BD |
| 6 | PPG2 | BD | PG2 | PG1 | E5' | E4' | E3' | E2' | E1' | PP | A1 | A2 | A3 | A4 | E1 | E2 | E3 | E4 | E5 | PPG1 |
| 7 | E5 | PPG1 | PPG2 | BD | PG2 | PG1 | E5' | E4' | E3' | E2' | E1' | PP | A1 | A2 | A3 | A4 | E1 | E2 | E3 | E4 |
| 8 | E3 | E4 | E5 | PPG1 | PPG2 | BD | PG2 | PG1 | E5' | E4' | E3' | E2' | E1' | PP | A1 | A2 | A3 | A4 | E1 | E2 |
| 9 | E1 | E2 | E3 | E4 | E5 | PPG1 | PPG2 | BD | PG2 | PG1 | E5' | E4' | E3' | E2' | E1' | PP | A1 | A2 | A3 | A4 |
| 10 | A3 | A4 | E1 | E2 | E3 | E4 | E5 | PPG1 | PPG2 | BD | PG2 | PG1 | E5' | E4' | E3' | E2' | E1' | PP | A1 | A2 |

Step No. 1: Two beds are processing feed (adsorption step), namely Bed 1 and Bed 10, while valves 011, 012, 101 and 102 are in an open position. Bed 9 and Bed 2 are interacting such that Bed 9 is sending equalization gas to Bed 7 through the seventh manifold. To achieve the (E1)-(E1') steps, valves 097, 027, 028 are open and valve 098 is used to control the rate. Bed 8 undergoing the third equalization step down (E3) is sending gas to Bed 3 (E3') via the sixth manifold. Valves 086, 036, 038 are open and valve 088 is used to control the rate of the (E3)-(E3') steps. Bed 7 undergoes the fifth equalization step down (E5) by sending gas to Bed 4 via the fifth manifold. Valves 075, 045, 048 are open and valve 078 controls the rate of the (E5)-(E5') steps. Bed 6 is providing the hydrogen lean purge gas (PPG2) to purge Bed 5. The rate of the (PPG2) step is controlled by valve 068. Meanwhile, valves 063, 053, 058 are fully open and valve 054 controls the pressure in Bed 5.

Step No. 2: Two beds are processing feed (adsorption step), namely Beds 1 and Bed 10. Valves 011, 012, 101 and 102 are in an open position. Bed 2 is in the product pressurization step (PP), (i.e. part of the product gas is recycled back to the process to raise the Bed 2 pressure). Valves 027 and 028 are open, while valve 007 controls the rate of this step. Bed 9 and Bed 3 are interacting such that Bed 9 is sending equalization gas to Bed 3 via the sixth manifold. To accomplish (E2)-(E2') steps, valves 096, 036, 038 are open and valve 098 is used to control the rate. Bed 8 undergoing the fourth equalization step down (E4) by sending gas to Bed 4 via the fifth manifold. Valves 085, 045, 048 are open and valve 088 controls the rate of the (E4)-(E4') steps. Bed 7 is providing the hydrogen rich purge gas to the Bed 5. The rate of the (PPG1) step is controlled by valve 078, while valves 073, 053, 058 are fully open and valve 054 controls the pressure in Bed 5. Bed 6 is in blowdown (BD) step, and the desorbed impurities exit the bed through control valve 064.

Another aspect of PSA cycles discussed herein is continuous regeneration of the beds through the sequential refluxing. As referred herein, and with the reference to a single bed in the cycle, sequential refluxing shall be understood that the sequential purge (PG) and equalization up (E4'-E1') steps being performed by the use of lowest hydrogen purity gas at the start of the refluxing, following by increasing hydrogen purity regenerates the bed up to production/adsorption pressure levels. The PSA cycles featuring more than one provide purge step have more sources of gas available for the purge steps. The regeneration of adsorbents is best achieved when the PPG gases are used such that the gas containing the most impurities is used first, then cleaner gases are used and the cleanest hydrogen gas is used last. Particularly in the 10-2-5 PSA cycle, the (PPG2) step gas came from the bed at a lower pressure than the (PPG1) step gas and thus it contains higher level of impurities—hydrogen lean purge gas. The bed pressure drops during the cycle from the adsorption (maximum) pressure at the beginning of the (E1) step through the steps (E2), (E3), (E4), (E5) than the (PPG1) step and (PPG2) step next. In order to maximize the adsorbent regeneration process the hydrogen lean gas (PPG2) gas should be used first (Step No. 13—(PG2) step) and then the hydrogen rich gas (PPG1) gas in Step No. 14—(PG1) step. This concept known as sequential refluxing protocol will always yield higher mass-transfer driving force resulting in more efficient regeneration process, and is discussed in detail in the commonly owned Baksh et al (U.S. Pat. No. 6,007,606), which is incorporated by reference in its entirety.

In another embodiment, a novel 10-3-4 PSA cycle has twenty steps and utilizing ten beds, the unit block is defined by duration of two steps $t_1+t_2$ and cycle time CT=10*($t_1+t_2$). This cycle features three parallel feeds and four bed-to-bed equalizations. By describing all events and interactions for the first two steps, the cycle is fully defined. FIG. 3 together with Table 11, below, are utilized to illustrate the cycle.

TABLE 11

10-3-4 Cycle Chart (Alternative 10 Bed H$_2$ PSA System Operation)

| Bed # | Step: | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| 1 | A1 | A2 | A3 | A4 | A5 | A6 | E1 | E2 | E3 | E4 | PPG1 | PPG2 | BD | PG2 | PG1 | E4' | E3' | E2' | E1' | PP |
| 2 | E1' | PP | A1 | A2 | A3 | A4 | A5 | A6 | E1 | E2 | E3 | E4 | PPG1 | PPG2 | BD | PG2 | PG1 | E4' | E3' | E2' |
| 3 | E3' | E2' | E1' | PP | A1 | A2 | A3 | A4 | A5 | A6 | E1 | E2 | E3 | E4 | PPG1 | PPG2 | BD | PG2 | PG1 | E4' |
| 4 | PG1 | E4' | E3' | E2' | E1' | PP | A1 | A2 | A3 | A4 | A5 | A6 | E1 | E2 | E3 | E4 | PPG1 | PPG2 | BD | PG2 |
| 5 | BD | PG2 | PG1 | E4' | E3' | E2' | E1' | PP | A1 | A2 | A3 | A4 | A5 | A6 | E1 | E2 | E3 | E4 | PPG1 | PPG2 |
| 6 | PPG1 | PPG2 | BD | PG2 | PG1 | E4' | E3' | E2' | E1' | PP | A1 | A2 | A3 | A4 | A5 | A6 | E1 | E2 | E3 | E4 |
| 7 | E3 | E4 | PPG1 | PPG2 | BD | PG2 | PG1 | E4' | E3' | E2' | E1' | PP | A1 | A2 | A3 | A4 | A5 | A6 | E1 | E2 |
| 8 | E1 | E2 | E3 | E4 | PPG1 | PPG2 | BD | PG2 | PG1 | E4' | E3' | E2' | E1' | PP | A1 | A2 | A3 | A4 | A5 | A6 |
| 9 | A5 | A6 | E1 | E2 | E3 | E4 | PPG1 | PPG2 | BD | PG2 | PG1 | E4' | E3' | E2' | E1' | PP | A1 | A2 | A3 | A4 |
| 10 | A3 | A4 | A5 | A6 | E1 | E2 | E3 | E4 | PPG1 | PPG2 | BD | PG2 | PG1 | E4' | E3' | E2' | E1' | PP | A1 | A2 |

Step No. 1: Three beds are processing feed (adsorption step), namely Bed 1, Bed 9 and Bed 10, while valves 011, 012, 091, 092, 101 and 102 are in the open position. Bed 8 and Bed 2 are interacting such that Bed 8 is sending equalization gas to Bed 2 via the seventh manifold. To carry out the (E1)-(E1') steps, valves 087, 027, 028 are open and valve 088 is employed to control the rate. Bed 7 undergoes the third equalization step down (E3) by routing gas to Bed 3 through the sixth manifold. Valves 076, 036, 038 are open and valve 078 is used to control the rate of (E3)-(E3') steps. Bed 6 is in the provide purge gas (PPG1) step (hydrogen rich purge gas), routing gas to Bed 4 through the third manifold. Valves 063, 043, 048 are open and valve 068 controls the rate of (PPG1) step. Bed 5 is in blowdown (BD) mode, and the desorbed impurities exit the bed through control valve 054.

Step No. 2: Three beds are processing feed (adsorption step), namely Bed 1, Bed 9 and Bed 10, while valves 011, 012, 091, 092, 101 and 102 are in the open position. Bed 2 is in the product pressurization step (PP) (i.e., part of the product gas is recycled back to the process to raise the pressure in Bed 2). Valves 027 and 028 are open while valve 007 controls the rate of this step. Bed 8 and Bed 3 are interacting such that Bed 8 is sending equalization gas to Bed 3 through the sixth manifold. To carry out the (E2)-(E2') steps, valves 086, 036, 038 are open and valve 088 is employed to control the rate. Bed 7 undergoes the fourth equalization step down (E4) by routing gas to Bed 4 via the fifth manifold. Valves 075, 045, 048 are open and valve 078 controls the rate of the (E4)-(E4') steps. Bed 6 during this step is providing the purge gas to the Bed 4. The rate of the (PPG2) step (i.e., hydrogen lean purge gas) is controlled by valve 068. Valves 063, 053, 058 are in the fully open position and valve 054 is employed to control the pressure in Bed 5 (i.e., (PG2) step).

Another alternative cycle to the 10-3-5 PSA cycle is the operation of a novel 10-4-3 PSA cycle when higher hydrogen throughput is required. This 10-4-3 PSA cycle features four parallel feeds and three bed-to-bed equalization steps. It is a twenty step cycle utilizing ten beds. Thus, the unit block will be defined by duration of two steps $t_1+t_2$ and the total cycle time $CT=10*(t_1+t_2)$. By describing all events and interactions for the first two steps, the cycle is fully defined. FIG. 3 together with Table 12, below, are utilized to illustrate the cycle.

TABLE 12

10-4-3 Cycle Chart (Alternative 10 Bed $H_2$ PSA System Operation)

| Bed # | Step: | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| 1 | A1 | A2 | A3 | A4 | A5 | A6 | A7 | A8 | E1 | E2 | E3 | PPG1 | PPG2 | BD | PG2 | PG1 | E3' | E2' | E1' | PP |
| 2 | E1' | PP | A1 | A2 | A3 | A4 | A5 | A6 | A7 | A8 | E1 | E2 | E3 | PPG1 | PPG2 | BD | PG2 | PG1 | E3' | E2' |
| 3 | E3' | E2' | E1' | PP | A1 | A2 | A3 | A4 | A5 | A6 | A7 | A8 | E1 | E2 | E3 | PPG1 | PPG2 | BD | PG2 | PG1 |
| 4 | PG2 | PG1 | E3' | E2' | E1' | PP | A1 | A2 | A3 | A4 | A5 | A6 | A7 | A8 | E1 | E2 | E3 | PPG1 | PPG2 | BD |
| 5 | PPG2 | BD | PG2 | PG1 | E3' | E2' | E1' | PP | A1 | A2 | A3 | A4 | A5 | A6 | A7 | A8 | E1 | E2 | E3 | PPG1 |
| 6 | E3 | PPG1 | PPG2 | BD | PG2 | PG1 | E3' | E2' | E1' | PP | A1 | A2 | A3 | A4 | A5 | A6 | A7 | A8 | E1 | E2 |
| 7 | E1 | E2 | E3 | PPG1 | PPG2 | BD | PG2 | PG1 | E3' | E2' | E1' | PP | A1 | A2 | A3 | A4 | A5 | A6 | A7 | A8 |
| 8 | A7 | A8 | E1 | E2 | E3 | PPG1 | PPG2 | BD | PG2 | PG1 | E3' | E2' | E1' | PP | A1 | A2 | A3 | A4 | A5 | A6 |
| 9 | A5 | A6 | A7 | A8 | E1 | E2 | E3 | PPG1 | PPG2 | BD | PG2 | PG1 | E3' | E2' | E1' | PP | A1 | A2 | A3 | A4 |
| 10 | A3 | A4 | A5 | A6 | A7 | A8 | E1 | E2 | E3 | PPG1 | PPG2 | BD | PG2 | PG1 | E3' | E2' | E1' | PP | A1 | A2 |

Step No. 1: Four beds are processing feed (adsorption step), namely Bed 1, Bed 8, Bed 9 and Bed 10, while valves 011, 012, 081, 082, 091, 092, 101 and 102 are maintained in the open position. Bed 7 and Bed 2 are interacting such that Bed 7 is sending/routing equalization gas to Bed 2 through the seventh manifold. To carry out the (E1)-(E1') steps, valves 077, 027, 028 are open and valve 078 is used to control the rate. Bed 6 undergoes the third equalization step down (E3) by sending gas to Bed 3 through the sixth manifold. Valves 066, 036, 038 are open and valve 068 is used to control the rate of the (E3)-(E3') steps. Bed 5 meanwhile provides the hydrogen lean purge gas to purge the Bed 4. The rate of the (PPG2) step is controlled by valve 058. Valves 053, 043, 048 are in a fully open position, and valve 044 controls the pressure in Bed 4.

Step No. 2: Four beds are processing feed (adsorption step), namely Bed 1, Bed 8, Bed 9 and Bed 10, and valves 011, 012, 081, 082, 091, 092, 101 and 102 are in the open position. Bed 2 is in the product pressurization step (PP), (i.e. part of the product gas is recycled back to the process to raise the Bed 2 pressure). Valves 027 and 028 are open while valve 007 controls the rate of this step. Bed 7 and Bed 3 are interacting such that Bed 7 is sending equalization gas to Bed 3 through the sixth manifold. To carry out the (E2)-(E2') steps, valves 076, 036, 038 are open and valve 078 is used to control the rate. Bed 6 is providing the hydrogen rich purge gas to Bed 4. The rate of the (PPG1) step is controlled by valve 068; valves 063, 043, 048 which are fully open and valve 044 controls the pressure in Bed 4. Bed 5 is in blowdown (BD) step and the desorbed impurities exit the bed through control valve 054. Further, as shown in Table 12, the 10-4-3 cycle follows the sequential refluxing protocol.

An alternative PSA cycle to the turndown mode 9-3-4 cycle is a novel 9-2-4 PSA cycle which offers additional recovery benefit at the expense of lower throughput compared to the related art. The 9-2-4 PSA cycle features two parallel feeds and four bed-to-bed equalization steps. It is an eighteen step cycle which utilizes nine beds. Thus, the unit block will be defined by duration of two steps $t_1+t_2$ and $CT=9*(t_1+t_2)$. By describing all events and interactions for the first two steps, the cycle is fully defined. FIG. 3 together with Table 13, below, are utilized to illustrate the cycle.

TABLE 13

9-2-4 Cycle Chart (Alternative 9 Bed H₂ PSA System Operation)

| Bed # | Step: 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| 1 | A1 | A2 | A3 | A4 | E1 | E2 | E3 | E4 | PPG1 | PPG2 | BD | PG2 | PG1 | E4' | E3' | E2' | E1' | PP |
| 2 | E1' | PP | A1 | A2 | A3 | A4 | E1 | E2 | E3 | E4 | PPG1 | PPG2 | BD | PG2 | PG1 | E4' | E3 | E2' |
| 3 | E3' | E2' | E1' | PP | A1 | A2 | A3 | A4 | E1 | E2 | E3 | E4 | PPG1 | PPG2 | BD | PG2 | PG1 | E4' |
| 4 | PG1 | E4' | E3' | E2' | E1' | PP | A1 | A2 | A3 | A4 | E1 | E2 | E3 | E4 | PPG1 | PPG2 | BD | PG2 |
| 5 | BD | PG2 | PG1 | E4' | E3' | E2' | E1' | PP | A1 | A2 | A3 | A4 | E1 | E2 | E3 | E4 | PPG1 | PPG2 |
| 6 | PPG1 | PPG2 | BD | PG2 | PG1 | E4' | E3' | E2' | E1' | PP | A1 | A2 | A3 | A4 | E1 | E2 | E3 | E4 |
| 7 | E3 | E4 | PPG1 | PPG2 | BD | PG2 | PG1 | E4' | E3' | E2' | E1' | PP | A1 | A2 | A3 | A4 | E1 | E2 |
| 8 | E1 | E2 | E3 | E4 | PPG1 | PPG2 | BD | PG2 | PG1 | E4' | E3' | E2' | E1' | PP | A1 | A2 | A3 | A4 |
| 9 | A3 | A4 | E1 | E2 | E3 | E4 | PPG1 | PPG2 | BD | PG2 | PG1 | E4' | E3' | E2' | E1' | PP | A1 | A2 |

Step No. 1: Two beds are processing feed (adsorption step), namely Bed 1 and Bed 9, while valves 011, 012, 091 and 092 are in the open position. Bed 8 and Bed 2 interact such that Bed 8 is sending equalization gas to Bed 2 through the seventh manifold. To achieve the (E1)-(E1') steps, valves 087, 027, 028 are open and valve 088 is used to control the rate. Bed 7 undergoes the third equalization step down (E3) by routing gas to Bed 3 through the sixth manifold. Valves 076, 036, 038 are open and valve 078 is used to control the rate of (E3)-(E3') steps. Bed 6 provides hydrogen rich purge gas to purge Bed 4. The rate of the (PPG1) step is controlled by valve 068, and valves 063, 043, 048 are in fully open position, while valve 044 controls the pressure in Bed 4. Bed 5 is in blowdown (BD) mode/step, and desorbed impurities exit the bed through control valve 054.

Step No. 2: Two beds are processing feed (adsorption step), namely Bed 1 and Bed 9, while valves 011, 012, 091 and 092 are in the open position. Bed 2 is in the product pressurization step (PP), (i.e. part of the product gas is recycled back to the process to raise the Bed 2 pressure). Valves 027 and 028 are open while valve 007 controls the flow rate of this step. Bed 8 and Bed 3 are interacting such that Bed 8 routes equalization gas to Bed 3 through the sixth manifold. To achieve the (E2)-(E2') steps, valves 086, 036, 038 are open and valve 088 is employed to control the rate. Bed 7 undergoes the fourth equalization step down (E4) by routing gas to Bed 4 through the fifth manifold. Meanwhile, valves 075, 045, 048 are open and valve 078 controls the rate of (E4)-(E4') steps. Bed 6 is provides the hydrogen lean purge gas to Bed 5. The rate of the (PPG2) step is controlled by valve 068, while valves 063, 053, 058 are fully open and valve 054 controls the pressure in Bed 5. As shown in Table 13, above, the 9-2-4 cycle follows the sequential refluxing protocol discussed above.

While the invention has been described in detail with reference to specific embodiments thereof, it will become apparent to one skilled in the art that various changes and modifications can be made, and equivalents employed, without departing from the scope of the appended claims.

What is claimed is:

1. A pressure swing adsorption process for separating a pressurized supply feed gas containing one or more strongly adsorbable component from at least one less strongly adsorbable product gas component in a ten bed pressure swing adsorption system to produce a continuous stream of product gas enriched in the less strongly adsorbable component and a continuous stream of offgas that is enriched in strongly adsorbable components, wherein the process cycle has twenty steps including five bed-to-bed equalizations steps, while three of the beds are in production.

2. The pressure swing adsorption process of claim 1, in accordance to the following cycle chart:

| Bed # | Step: 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | A1 | A2 | A3 | A4 | A5 | A6 | E1 | E2 | E3 | E4 | E5 | PPG | BD | PG | E5' | E4' | E3' | E2' | E1' | PP |
| 2 | E1' | PP | A1 | A2 | A3 | A4 | A5 | A6 | E1 | E2 | E3 | E4 | E5 | PPG | BD | PG | E5' | E4' | E3' | E2' |
| 3 | E3' | E2' | E1' | PP | A1 | A2 | A3 | A4 | A5 | A6 | E1 | E2 | E3 | E4 | E5 | PPG | BD | PG | E5' | E4' |
| 4 | E5' | E4' | E3' | E2' | E1' | PP | A1 | A2 | A3 | A4 | A5 | A6 | E1 | E2 | E3 | E4 | E5 | PPG | BD | PG |
| 5 | BD | PG | E5' | E4' | E3' | E2' | E1' | PP | A1 | A2 | A3 | A4 | A5 | A6 | E1 | E2 | E3 | E4 | E5 | PPG |
| 6 | E5 | PPG | BD | PG | E5' | E4' | E3' | E2' | E1' | PP | A1 | A2 | A3 | A4 | A5 | A6 | E1 | E2 | E3 | E4 |
| 7 | E3 | E4 | E5 | PPG | BD | PG | E5' | E4' | E3' | E2' | E1' | PP | A1 | A2 | A3 | A4 | A5 | A6 | E1 | E2 |
| 8 | E1 | E2 | E3 | E4 | E5 | PPG | BD | PG | E5' | E4' | E3' | E2' | E1' | PP | A1 | A2 | A3 | A4 | A5 | A6 |
| 9 | A5 | A6 | E1 | E2 | E3 | E4 | E5 | PPG | BD | PG | E5' | E4' | E3' | E2' | E1' | PP | A1 | A2 | A3 | A4 |
| 10 | A3 | A4 | A5 | A6 | E1 | E2 | E3 | E4 | E5 | PPG | BD | PG | E5' | E4' | E3' | E2' | E1' | PP | A1 | A2 |

Wherein:
A1=First Adsorption Step
A2=Second Adsorption Step
A3=Third Adsorption Step
A4=Fourth Adsorption Step
A5=Fifth Adsorption Step
A6=Sixth Adsorption Step E1=First Equalization Down
E2=Second Equalization Down
E3=Third Equalization Down
E4=Fourth Equalization Down
E5=Fifth Equalization Down
PPG=Provide Purge Gas
BD=Blowdown
PG=Purge using gas from PPG step
E5'=Equalization Up (using gas from E5 step)
E4'=Equalization Up (using gas from E4 step)
E3'=Equalization Up (using gas from E3 step)
E2'=Equalization Up (using gas from E2 step)
E1'=Equalization Up (using gas from E1 step)
PP=Product Pressurization.

3. The pressure swing adsorption process of claim 1, wherein said less strongly adsorbable product gas is hydrogen.

4. The pressure swing adsorption process of claim 1, wherein the supply feed gas containing one or more strongly adsorbable component is selected from the group consisting of hydrocarbons, carbon dioxide, carbon monoxide, argon, nitrogen and water vapor.

5. The pressure swing adsorption process of claim 1, wherein each adsorbent bed contains alumina, carbon and zeolite material configured in layers disposes in this particular order for feed gas processing.

6. The pressure swing adsorption process of claim 5, where the carbon and zeolite layers are each subdivided into two layers with different particle size.

7. The pressure swing adsorption process of claim 6, where the first of the subdivided carbon layers encountered by the supply feed gas has a particle size of about 0.5 to 1.5 mm and an affinity for the carbon dioxide impurity.

8. The pressure swing adsorption process of claim 6, where the second of the subdivided carbon layers encountered by the supply feed gas has a particle size of about 2.0 to 3.0 mm and an affinity for the methane impurities.

9. The pressure swing adsorption process of claim 6, where the first of the subdivided zeolite layers encountered by the supply feed gas has a particle size of about 0.5 to 2.0 mm and an affinity for the carbon monoxide impurity.

10. The pressure swing adsorption process of claim 6, where the second of the subdivided zeolite layers encountered by the supply feed gas has a particle size of about 2.0 to 3.0 mm and an affinity for the nitrogen impurity.

11. A pressure swing adsorption process for separating a pressurized supply feed gas containing one or more strongly adsorbable component from at least one less strongly adsorbable product gas component in a nine bed pressure swing adsorption system to produce a continuous stream of product gas enriched in the less strongly adsorbable component and a continuous stream of offgas that is enriched in strongly adsorbable components, wherein the process cycle has eighteen steps including four bed-to-bed equalizations steps, while three of the beds are in production, in accordance to the following cycle chart:

| Bed # | \multicolumn{18}{c}{Step:} | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| 1 | A1 | A2 | A3 | A4 | A5 | A6 | E1 | E2 | E3 | E4 | PPG | BD | PG | E4' | E3' | E2' | E1' | PP |
| 2 | E1' | PP | A1 | A2 | A3 | A4 | A5 | A6 | E1 | E2 | E3 | E4 | PPG | BD | PG | E4' | E3' | E2' |
| 3 | E3' | E2' | E1' | PP | A1 | A2 | A3 | A4 | A5 | A6 | E1 | E2 | E3 | E4 | PPG | BD | PG | E4' |
| 4 | PG | E4' | E3' | E2' | E1' | PP | A1 | A2 | A3 | A4 | A5 | A6 | E1 | E2 | E3 | E4 | PPG | BD |
| 5 | PPG | BD | PG | E4' | E3' | E2' | E1' | PP | A1 | A2 | A3 | A4 | A5 | A6 | E1 | E2 | E3 | E4 |
| 6 | E3 | E4 | PPG | BD | PG | E4' | E3' | E2' | E1' | PP | A1 | A2 | A3 | A4 | A5 | A6 | E1 | E2 |
| 7 | E1 | E2 | E3 | E4 | PPG | BD | PG | E4' | E3' | E2' | E1' | PP | A1 | A2 | A3 | A4 | A5 | A6 |
| 8 | A5 | A6 | E1 | E2 | E3 | E4 | PPG | BD | PG | E4' | E3' | E2' | E1' | PP | A1 | A2 | A3 | A4 |
| 9 | A3 | A4 | A5 | A6 | E1 | E2 | E3 | E4 | PPG | BD | PG | E4' | E3' | E2' | E1' | PP | A1 | A2 | wherein:

A1=First Adsorption Step

A2=Second Adsorption Step

A3=Third Adsorption Step

A4=Fourth Adsorption Step

A5=Fifth Adsorption Step

A6=Sixth Adsorption Step

E1=First Equalization Down

E2=Second Equalization Down

E3=Third Equalization Down

E4=Fourth Equalization Down

PPG=Provide Purge Gas

BD=Blowdown

PG=Purge using gas from PPG step

E4'=Equalization Up (using gas from E4 step)

E3'=Equalization Up (using gas from E3 step)

E2'=Equalization Up (using gas from E2 step

E1'=Equalization Up (using gas from E1 step)

PP=Product Pressurization.

12. A pressure swing adsorption process for separating a pressurized supply feed gas containing one or more strongly adsorbable component from at least one less strongly adsorbable product gas component in a eight bed pressure swing adsorption system to produce a continuous stream of product gas enriched in the less strongly adsorbable component and a continuous stream of offgas that is enriched in strongly adsorbable components, wherein the process cycle has sixteen steps including three bed-to-bed equalizations steps, while three of the beds are in production.

13. The pressure swing adsorption process of claim 12, in accordance to the following cycle chart:

| Bed | Step: | | | | | | | | | | | | | | | |
|---|---|---|---|---|---|---|---|---|---|---|---|---|---|---|---|---|
| # | 1 | 2 | 3 | 4 | 5 | 6 | 7 | 8 | 9 | 10 | 11 | 12 | 13 | 14 | 15 | 16 |
| 1 | A1 | A2 | A3 | A4 | A5 | A6 | E1 | E2 | E3 | PPG1 | BD | PG1 | E3' | E2' | E1' | PP |
| 2 | E1' | PP | A1 | A2 | A3 | A4 | A5 | A6 | E1 | E2 | E3 | PPG1 | BD | PG1 | E3' | E2' |
| 3 | E3' | E2' | E1' | PP | A1 | A2 | A3 | A4 | A5 | A6 | E1 | E2 | E3 | PPG1 | BD | PG1 |
| 4 | BD | PG1 | E3' | E2' | E1' | PP | A1 | A2 | A3 | A4 | A5 | A6 | E1 | E2 | E3 | PPG1 |
| 5 | E3 | PPG1 | BD | PG1 | E3' | E2' | E1' | PP | A1 | A2 | A3 | A4 | A5 | A6 | E1 | E2 |
| 6 | E1 | E2 | E3 | PPG1 | BD | PG1 | E3' | E2' | E1' | PP | A1 | A2 | A3 | A4 | A5 | A6 |
| 7 | A5 | A6 | E1 | E2 | E3 | PPG1 | BD | PG1 | E3' | E2' | E1' | PP | A1 | A2 | A3 | A2 |
| 8 | A3 | A4 | A5 | A6 | E1 | E2 | E3 | PPG1 | BD | PG1 | E3' | E2' | E1' | PP | A1 | A2 | where:
A1=First Adsorption Step
A2=Second Adsorption Step
A3=Third Adsorption Step
A4=Fourth Adsorption Step
A5=Fifth Adsorption Step
A6=Sixth Adsorption Step
E1=First Equalization Down
E2=Second Equalization Down
E3=Third Equalization Down
PPG=Provide Purge Gas
BD=Blowdown
PG=Purge using gas from PPG step
E3'=Equalization Up (using gas from E3 step)
E2'=Equalization Up (using gas from E2 step)
E1'=Equalization Up (using gas from E1 step)
PP=Product Pressurization.

14. A pressure swing adsorption process for separating a pressurized supply feed gas containing one or more strongly adsorbable component from at least one less strongly adsorbable product gas component in a seven bed pressure swing adsorption system to produce a continuous stream of product gas enriched in the less strongly adsorbable component and a continuous stream of offgas that is enriched in strongly adsorbable components, wherein the process cycle has twenty one steps including three bed-to-bed equalizations steps, while two of the beds are in production, in accordance to the following cycle chart:

where:
A1=First Adsorption Step
A2=Second Adsorption Step
A3=Third Adsorption Step
A4=Fourth Adsorption Step
A5=Fifth Adsorption Step
A6=Sixth Adsorption Step
E1=First Equalization Down
E2=Second Equalization Down
PPG1=First Provide Purge Gas Step
E3=Third Equalization Down
PPG2=Second Provide Purge Gas Step
BD1=First Blowdown
BD2=Second Blowdown
PG2=Purge step using gas from PPG2 Step
PG1=Purge step using gas from PPG1 Step
E3'=Equalization Up (using gas from E3 step)
E2'=Equalization Up (using gas from E2 step)
E1'=Equalization Up (using gas from E1 step)
PP=Product Pressurization.

15. A pressure swing adsorption process for separating a pressurized supply feed gas containing one or more strongly adsorbable component from at least one less strongly adsorbable product gas component in a five bed pressure swing adsorption system to produce a continuous stream of product gas enriched in the less strongly adsorbable component and a continuous stream of offgas that is enriched in strongly adsorbable components, wherein the process cycle has fifteen steps including two bed-to-bed equalizations steps, while two of the beds are in production.

| Bed | Step: | | | | | | | | | | |
|---|---|---|---|---|---|---|---|---|---|---|---|
| # | 1 | 2 | 3 | 4 | 5 | 6 | 7 | 8 | 9 | 10 | 11 |
| 1 | A1 | A2 | A3 | A4 | A5 | A6 | E1 | E1 | E2 | PPG1 | E3 |
| 2 | E1' | E1' | PP | A1 | A2 | A3 | A4 | A5 | A6 | E1 | E1 |
| 3 | PG1 | E3' | E2' | E1' | E1' | PP | A1 | A2 | A3 | A4 | A5 |
| 4 | BD1 | BD2 | PG2 | PG1 | E3' | E2' | E1' | E1' | PP | A1 | A2 |
| 5 | PPG1 | E3 | PPG2 | BD1 | BD2 | PG2 | PG1 | E3' | E2' | E1' | E1' |
| 6 | E1 | E1 | E2 | PPG1 | E3 | PPG2 | BD1 | BD2 | PG2 | PG1 | E3' |
| 7 | A4 | A5 | A6 | E1 | E1 | E2 | PPG1 | E3 | PPG2 | BD1 | BD2 |

| Bed | Step: | | | | | | | | | |
|---|---|---|---|---|---|---|---|---|---|---|
| # | 12 | 13 | 14 | 15 | 16 | 17 | 18 | 19 | 20 | 21 |
| 1 | PPG2 | BD1 | BD2 | PG2 | PG1 | E3' | E2' | E1' | E1' | PP |
| 2 | E2 | PPG1 | E3 | PPG2 | BD1 | BD2 | PG2 | PG1 | E3' | E2' |
| 3 | A6 | E1 | E1 | E2 | PPG1 | E3 | PPG2 | BD1 | BD2 | PG2 |
| 4 | A3 | A4 | A5 | A6 | E1 | E1 | E2 | PPG1 | E3 | PPG2 |
| 5 | PP | A1 | A2 | A3 | A4 | A5 | A6 | E1 | E1 | E2 |
| 6 | E2' | E1' | E1' | PP | A1 | A2 | A3 | A4 | A5 | A6 |
| 7 | PG2 | PG1 | E3' | E2' | E1' | E1' | PP | A1 | A2 | A3 |

16. The pressure swing adsorption process of claim 15, in accordance to the following cycle chart:

| Bed # | Step: | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 1 | A1 | A2 | A3 | A4 | A5/PP1 | A6/PP2 | E1 | PPG | E2 | BD | PG | E2' | E1' | PP1 | PP2 |
| 2 | E1' | PP1 | PP2 | A1 | A2 | A3 | A4 | A5/PP1 | A6/PP2 | E1 | PPG | E2 | BD | PG | E2' |
| 3 | BD | PG | E2' | E1' | PP1 | PP2 | A1 | A2 | A3 | A4 | A5/PP1 | A6/PP2 | E1 | PPG | E2 |
| 4 | E1 | PPG | E2 | BD | PG | E2' | E1' | PP1 | PP2 | A1 | A2 | A3 | A4 | A5/PP1 | A6/PP2 |
| 5 | A4 | A5/PP1 | A6/PP2 | E1 | PPG | E2 | BD | PG | E2' | E1' | PP1 | PP2 | A1 | A2 | A3 | where:
A1=First Adsorption Step
A2=Second Adsorption Step
A3=Third Adsorption Step
A4=Fourth Adsorption Step
A5/PP1=Fifth Adsorption Step/First Product Pressurization
A6/PP2=Sixth Adsorption Step/Second Product Pressurization
E1=First Equalization Down
PPG=Provide Purge Gas
E2=Second Equalization Down
BD=Blowdown
PG=Purge using gas from PPG step
E2'=Equalization Up (using gas from E2 step)
E1'=Equalization Up (using gas from E1 step)
PP1=First Product Pressurization
PP2=Second Product Pressurization.

17. A pressure swing adsorption process for separating a pressurized supply feed gas containing one or more strongly adsorbable component from at least one less strongly adsorbable product gas component in a ten bed pressure swing adsorption system to produce a continuous stream of product gas enriched in the less strongly adsorbable component and a continuous stream of offgas that is enriched in strongly adsorbable components, wherein the process cycle has twenty steps including five bed-to-bed equalizations steps, while two of the beds are in production.

18. The pressure swing adsorption process of claim 17, in accordance to the following cycle chart:

where:
A1=First Adsorption Step
A2=Second Adsorption Step
A3=Third Adsorption Step
A4=Fourth Adsorption Step
E1=First Equalization Down
E2=Second Equalization Down
E3=Third Equalization Down
E4=Fourth Equalization Down
E5=Fifth Equalization Down
PPG1=First Provide Purge Gas Step
PPG2=Second Provide Purge Gas Step
BD=Blowdown
PG2=Purge step using gas from PPG2 Step
PG1=Purge step using gas from PPG1 step
E5'=Equalization Up (using gas from E5 step)
E4'=Equalization Up (using gas from E4 step)
E3'=Equalization Up (using gas from E3 step)
E2'=Equalization Up (using gas from E2 step)
E1'=Equalization Up (using gas from E1 step)
PP=Product Pressurization.

19. A pressure swing adsorption process for separating a pressurized supply feed gas containing one or more strongly adsorbable component from at least one less strongly adsorbable product gas component in a ten bed pressure swing adsorption system to produce a continuous stream of product gas enriched in the less strongly adsorbable component and a continuous stream of offgas that is enriched in strongly adsorbable components, wherein the process cycle has twenty steps including four bed-to-bed equalizations steps, while three of the beds are in production, in accordance to the following cycle chart:

| Bed # | Step: | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| 1 | A1 | A2 | A3 | A4 | E1 | E2 | E3 | E4 | E5 | PPG1 | PPG2 | BD | PG2 | PG1 | E5' | E4' | E3' | E2' | E1' | PP |
| 2 | E1' | PP | A1 | A2 | A3 | A4 | E1 | E2 | E3 | E4 | E5 | PPG1 | PPG2 | BD | PG2 | PG1 | E5' | E4' | E3' | E2' |
| 3 | E3' | E2' | E1' | PP | A1 | A2 | A3 | A4 | E1 | E2 | E3 | E4 | E5 | PPG1 | PPG2 | BD | PG2 | PG1 | E5' | E4' |
| 4 | E5' | E4' | E3' | E2' | E1' | PP | A1 | A2 | A3 | A4 | E1 | E2 | E3 | E4 | E5 | PPG1 | PPG2 | BD | PG2 | PG1 |
| 5 | PG2 | PG1 | E5' | E4' | E3' | E2' | E1' | PP | A1 | A2 | A3 | A4 | E1 | E2 | E3 | E4 | E5 | PPG1 | PPG2 | BD |
| 6 | PPG2 | BD | PG2 | PG1 | E5' | E4' | E3' | E2' | E1' | PP | A1 | A2 | A3 | A4 | E1 | E2 | E3 | E4 | E5 | PPG1 |
| 7 | E5 | PPG1 | PPG2 | BD | PG2 | PG1 | E5' | E4' | E3' | E2' | E1' | PP | A1 | A2 | A3 | A4 | E1 | E2 | E3 | E4 |
| 8 | E3 | E4 | E5 | PPG1 | PPG2 | BD | PG2 | PG1 | E5' | E4' | E3' | E2' | E1' | PP | A1 | A2 | A3 | A4 | E1 | E2 |
| 9 | E1 | E2 | E3 | E4 | E5 | PPG1 | PPG2 | BD | PG2 | PG1 | E5' | E4' | E3' | E2' | E1' | PP | A1 | A2 | A3 | A4 |
| 10 | A3 | A4 | E1 | E2 | E3 | E4 | E5 | PPG1 | PPG2 | BD | PG2 | PG1 | E5' | E4' | E3' | E2' | E1' | PP | A1 | A2 |

| Bed | Step: | | | | | | | | | | | | | | | | | | | |
|---|---|---|---|---|---|---|---|---|---|---|---|---|---|---|---|---|---|---|---|---|
| # | 1 | 2 | 3 | 4 | 5 | 6 | 7 | 8 | 9 | 10 | 11 | 12 | 13 | 14 | 15 | 16 | 17 | 18 | 19 | 20 |
| 1 | A1 | A2 | A3 | A4 | A5 | A6 | E1 | E2 | E3 | E4 | PPG1 | PPG2 | BD | PG2 | PG1 | E4' | E3' | E2' | E1' | PP |
| 2 | E1' | PP | A1 | A2 | A3 | A4 | A5 | A6 | E1 | E2 | E3 | E4 | PPG1 | PPG2 | BD | PG2 | PG1 | E4' | E3' | E2' |
| 3 | E3' | E2' | E1' | PP | A1 | A2 | A3 | A4 | A5 | A6 | E1 | E2 | E3 | E4 | PPG1 | PPG2 | BD | PG2 | PG1 | E4' |
| 4 | PG1 | E4' | E3' | E2' | E1' | PP | A1 | A2 | A3 | A4 | A5 | A6 | E1 | E2 | E3 | E4 | PPG1 | PPG2 | BD | PG2 |
| 5 | BD | PG2 | PG1 | E4' | E3' | E2' | E1' | PP | A1 | A2 | A3 | A4 | A5 | A6 | E1 | E2 | E3 | E4 | PPG1 | PPG2 |
| 6 | PPG1 | PPG2 | BD | PG2 | PG1 | E4' | E3' | E2' | E1' | PP | A1 | A2 | A3 | A4 | A5 | A6 | E1 | E2 | E3 | E4 |
| 7 | E3 | E4 | PPG1 | PPG2 | BD | PG2 | PG1 | E4' | E3' | E2' | E1' | PP | A1 | A2 | A3 | A4 | A5 | A6 | E1 | E2 |
| 8 | E1 | E2 | E3 | E4 | PPG1 | PPG2 | BD | PG2 | PG1 | E4' | E3' | E2' | E1' | PP | A1 | A2 | A3 | A4 | A5 | A6 |
| 9 | A5 | A6 | E1 | E2 | E3 | E4 | PPG1 | PPG2 | BD | PG2 | PG1 | E4' | E3' | E2' | E1' | PP | A1 | A2 | A3 | A4 |
| 10 | A3 | A4 | A5 | A6 | E1 | E2 | E3 | E4 | PPG1 | PPG2 | BD | PG2 | PG1 | E4' | E3' | E2' | E1' | PP | A1 | A2 | where:
A1=First Adsorption Step
A2=Second Adsorption Step
A3=Third Adsorption Step
A4=Fourth Adsorption Step
A5=Fifth Adsorption Step
A6=Sixth Adsorption Step
E1=First Equalization Down
E2=Second Equalization Down
E3=Third Equalization Down
E4=Fourth Equalization Down
PPG1=First Provide Purge Gas Step
PPG2=Second Provide Purge Gas Step
BD=Blowdown
PG2=Purge step using gas from PPG2 step
PG1=Purge step using gas from PPG1 step
E4'=Equalization Up (using gas from E4 step)
E3'=Equalization Up (using gas from E3 step)
E2'=Equalization Up (using gas from E2 step)
E1'=Equalization Up (using gas from E1 step)
PP=Product Pressurization.

20. A pressure swing adsorption process for separating a pressurized supply feed gas containing one or more strongly adsorbable component from at least one less strongly adsorbable product gas component in a nine bed pressure swing adsorption system to produce a continuous stream of product gas enriched in the less strongly adsorbable component and a continuous stream of offgas that is enriched in strongly adsorbable components, wherein the process cycle has eighteen steps including four bed-to-bed equalizations steps, while two of the beds are in production.

21. The pressure swing adsorption process of claim 20, in accordance to the following cycle chart:

| Bed | Step: | | | | | | | | | | | | | | | | | |
|---|---|---|---|---|---|---|---|---|---|---|---|---|---|---|---|---|---|---|
| # | 1 | 2 | 3 | 4 | 5 | 6 | 7 | 8 | 9 | 10 | 11 | 12 | 13 | 14 | 15 | 16 | 17 | 18 |
| 1 | A1 | A2 | A3 | A4 | E1 | E2 | E3 | E4 | PPG1 | PPG2 | BD | PG2 | PG1 | E4' | E3' | E2' | E1' | PP |
| 2 | E1' | PP | A1 | A2 | A3 | A4 | E1 | E2 | E3 | E4 | PPG1 | PPG2 | BD | PG2 | PG1 | E4' | E3' | E2' |
| 3 | E3' | E2' | E1' | PP | A1 | A2 | A3 | A4 | E1 | E2 | E6 | E4 | PPG1 | PPG2 | BD | PG2 | PG1 | E4' |
| 4 | PG1 | E4' | E3' | E2' | E1' | PP | A1 | A2 | A3 | A4 | E1 | E2 | E3 | E4 | PPG1 | PPG2 | BD | PG2 |
| 5 | BD | PG2 | PG1 | E4' | E3' | E2' | E1' | PP | A1 | A2 | A3 | A4 | E1 | E2 | E3 | E4 | PPG1 | PPG2 |
| 6 | PPG1 | PPG2 | BD | PG2 | PG1 | E4' | E3' | E2' | E1' | PP | A1 | A2 | A3 | A4 | E1 | E2 | E3 | E4 |
| 7 | E3 | E4 | PPG1 | PPG2 | BD | PG2 | PG1 | E4' | E3' | E2' | E1' | PP | A1 | A2 | A3 | A4 | E1 | E2 |
| 8 | E1 | E2 | E3 | E4 | PPG1 | PPG2 | BD | PG2 | PG1 | E4' | E3' | E2' | E1' | PP | A1 | A2 | A3 | A4 |
| 9 | A3 | A4 | E1 | E2 | E3 | E4 | PPG1 | PPG2 | BD | PG2 | PG1 | E4' | E3' | E2' | E1' | PP | A1 | A2 | where:
A1=First Adsorption Step
A2=Second Adsorption Step
A3=Third Adsorption Step
A4=Fourth Adsorption Step
E1=First Equalization Down
E2=Second Equalization Down
E3=Third Equalization Down
E4=Fourth Equalization Down
PPG1=First Provide Purge Gas Step
PPG2=Second Provide Purge Gas Step
BD=Blowdown
PG2=Purge step using gas from PPG2 step
PG1=Purge step using gas from PPG1 step
E4'=Equalization Up (using gas from E4 step)
E3'=Equalization Up (using gas from E3 step)
E2"=Equalization Up (using gas from E2 step)
E1"=Equalization Up (using gas from E1 step)
PP=Product Pressurization.

* * * * *